US010075654B2

(12) United States Patent
David et al.

(10) Patent No.: US 10,075,654 B2
(45) Date of Patent: Sep. 11, 2018

(54) METHOD, APPARATUS AND SYSTEM FOR IMAGE PROCESSING

(71) Applicant: SONY CORPORATION, Tokyo (JP)

(72) Inventors: Morgan William Amos David, Tilford (GB); Jonathan James Stone, Reading (GB)

(73) Assignee: SONY CORPORATION, Tokyo (JP)

( * ) Notice: Subject to any disclaimer, the term of this patent is extended or adjusted under 35 U.S.C. 154(b) by 6 days.

(21) Appl. No.: 14/787,961

(22) PCT Filed: May 9, 2014

(86) PCT No.: PCT/GB2014/051422
§ 371 (c)(1),
(2) Date: Oct. 29, 2015

(87) PCT Pub. No.: WO2015/001296
PCT Pub. Date: Jan. 8, 2015

(65) Prior Publication Data
US 2016/0112652 A1 Apr. 21, 2016

(30) Foreign Application Priority Data

Jul. 4, 2013 (GB) .................................. 1312028.2
Jul. 4, 2013 (GB) .................................. 1312029.0

(51) Int. Cl.
*H04N 5/225* (2006.01)
*H04N 5/262* (2006.01)
(Continued)

(52) U.S. Cl.
CPC ......... *H04N 5/2628* (2013.01); *H04N 1/3877* (2013.01); *H04N 5/23235* (2013.01); *H04N 5/23293* (2013.01); *H04N 5/2621* (2013.01)

(58) Field of Classification Search
None
See application file for complete search history.

(56) References Cited

U.S. PATENT DOCUMENTS 6,137,534 A * 10/2000 Anderson ............ H04N 1/0044
348/222.1
6,963,365 B2  11/2005 Baron et al.
(Continued)

FOREIGN PATENT DOCUMENTS

EP  1 763 215 A2  3/2007

OTHER PUBLICATIONS

International Search Report dated Jun. 30, 2014, in PCT/GB2014/051422 filed May 9, 2014.

*Primary Examiner* — Twyler Lamb Haskins
*Assistant Examiner* — Dwight Alex C Tejano
(74) *Attorney, Agent, or Firm* — Oblon, McClelland, Maier & Neustadt, L.L.P.

(57) ABSTRACT

An image processing device, including an image receiver operable to receive a first image; an image converter operable to convert the first image to a second image, the second image being a smaller-sized representation of the first image; an image pre-processor operable to perform an imaging effect on the second image to form a third image, the imaging effect being defined by an imaging effect parameter; a first output device operable to output the third image for display; and a second output device operable to output the first image and the imaging effect parameter.

18 Claims, 28 Drawing Sheets

(51) Int. Cl.
*H04N 1/387* (2006.01)
*H04N 5/232* (2006.01)

(56) References Cited

U.S. PATENT DOCUMENTS

| | | |
|---|---|---|
| 7,990,412 B2 | 8/2011 | Jacobsen et al. |
| 8,094,230 B2 | 1/2012 | Hosoi et al. |
| 2004/0252217 A1* | 12/2004 | Battles .................. H04N 5/232 |
| | | 348/333.01 |
| 2005/0206734 A1 | 9/2005 | Kubo et al. |
| 2005/0275737 A1 | 12/2005 | Cheng |
| 2006/0078214 A1 | 4/2006 | Gallagher |
| 2007/0052819 A1* | 3/2007 | Nakao ................ H04N 1/00204 |
| | | 348/231.1 |
| 2013/0033615 A1 | 2/2013 | Ecrement |
| 2015/0271355 A1* | 9/2015 | Matsumoto .......... H04N 1/2112 |
| | | 348/231.2 |

\* cited by examiner

METHOD, APPARATUS AND SYSTEM FOR IMAGE PROCESSING

CROSS-REFERENCE TO RELATED APPLICATIONS

The present application is based on PCT filing PCT/GB2014/051422 filed May 9, 2014, and claims priority to United Kingdom application GB1312028.2 & GB1312029.0 filed on 4 Jul. 2014, the contents of each of which are incorporated herein by reference in their entirety.

BACKGROUND

Field of the Disclosure

The present invention relates to a method, apparatus and system for image processing.

Description of the Related Art

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present invention. Currently, it is possible to add visual effects to images using computer software. For example, it is possible to emulate the capability of a shift lens by applying a geometric transformation to an image using Adobe® Photoshop®. This is known as shift correction. However, there are two problems with this. Firstly, a user must capture and store an image before applying the correction. This can cause severe problems during capturing images because the application shift correction may crop the image. As the user does not know in advance what parts of the image will be cropped, application of the shift correction may crop a relevant part of the image.

Secondly, the application of visual effects such as shift correction are generally only performed with still images. This is due to a lack of suitable methods for performing such effects on moving images. Furthermore, if such effects are applied to moving images, such as during film-making, the problem noted above regarding inadvertent cropping of images is a severe problem. It is very expensive, and sometimes impossible, to re-shoot a scene where inadvertent cropping of images in a scene has taken place. It is an aim of embodiments of the disclosure to address at least these issues.

SUMMARY

In one aspect, the present invention provides an image processing device, comprising image receiver circuitry configured to receive a first image; image converter circuitry configured to convert the first image to a second image, the second image being a smaller-sized representation of the first image; image pre-processor circuitry configured to perform an imaging effect on the second image to form a third image, the imaging effect being defined by an imaging effect parameter; first output device circuitry configured to output the third image for display; and second output device circuitry operable to output the first image and the imaging effect parameter.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
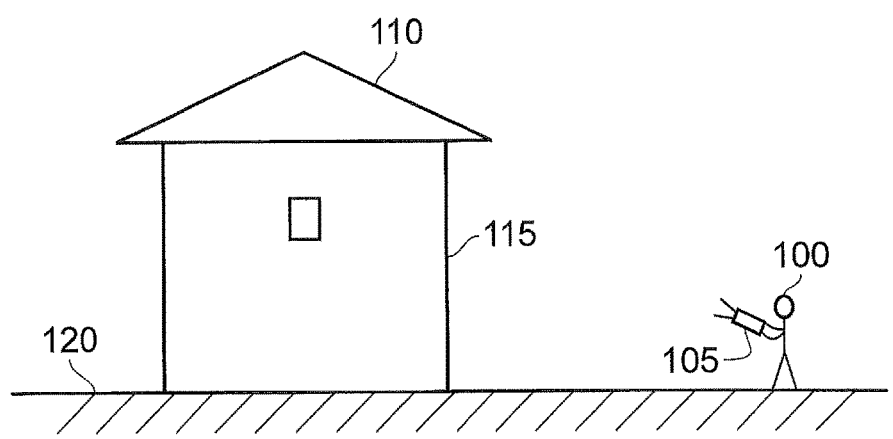
FIG. 1 describes a user capturing an image of a tall object using a camera.

In one aspect, the present invention provides an image processing device, comprising an image receiver configured to receive a first image; an image converter operable to convert the first image to a second image, the second image being a smaller-sized representation of the first image; an image pre-processor operable to perform an imaging effect on the second image to form a third image, the imaging effect being defined by an imaging effect parameter; a first output device operable to output the third image for display; and a second output device operable to output the first image and the imaging effect parameter.

Advantageously, since the second image is a smaller-sized representation of the first image, an imaging effect can be applied to the second image with less processing when compared to applying the imaging effect to the full-size first image, which can be a processor intensive task. A user is able to thus quickly and easily preview the imaging effect with the present invention. At the same time, because the full-size first image is output with the imaging effect paramater, which defines the imaging effect, that same imaging effect can then be applied to the full-size first image at a later time. A high quality, full resolution image with the imaging effect applied can thus still be obtained.

In embodiments, the second image may be one of a compressed version of the first image or a lower resolution version of the first image. Advantageously, both of these image types can have an imaging effect applied to them with less processing when compared to the full-size first image.

In embodiments, the second output device may output the first image and imaging effect parameter to a storage medium. Advantageously, this allows the first image and imaging effect parameter to be retrieved and processed at a time convenient to the user.

In embodiments, the second output device may transmit the first image and the imaging effect parameter to a remote device. Advantageously, this allows the first image and imaging effect parameter to be passed to a device which may be more suitable for the processor intensive task of performing the imaging effect on the full-size first image. The work flow of performing the imaging effect on the full-size first image is thus made more efficient.

In embodiments, the first image and imaging effect parameter may be transmitted to the remote device over a computer network. Advantageously, this allows the first image and imaging effect parameter to be transmitted using existing computer network infrastructure, improving the convenience for the user.

In embodiments, the imaging effect may be a shift correction effect and the imaging effect parameter may be a shift correction parameter. There may be a shift correction controller operable to generate the shift correction parameter. Advantageously, this allows the user to preview a shift correction effect as an imaging effect on the second image. This aids the user in image composition, as it allows the user to be aware of any sections of an image which may become cropped following a shift correction effect being applied.

In embodiments, the shift correction parameter may be an angle by which the second image must be digitally rotated in three-dimensional space in order to achieve the shift correction effect. Advantageously, this gives a direct numerical value which indicates to an image processor the extent to which an image must be rotated in order to perform the shift correction. No additional processing thus needs to be performed on the shift correction parameter before the shift correction effect can be applied, thus reducing the total amount of processing required.

In embodiments, the shift correction controller may receive an input from a user to select a value of the angle of the shift correction parameter to be generated. Advantageously, this gives direct control to the user as to the extent of shift correction to be applied to an image.

In embodiments, the first image may be captured by a camera and the value of the angle of the shift correction parameter may be selected by the shift correction controller using data from one of an accelerometer or gravimeter associated with the camera. Advantageously, this allows the extent of shift correction to be applied to an image to be decided automatically without the need for input from the user.

In embodiments, the image receiver may receive a plurality of first images at a predetermined frame rate, and a time between the image receiver receiving each first image and the first output device outputting a respective third image for display may be less than or equal to the time period between successive first images. Advantageously, this allows an imaging effect on each image in a sequence of captured images to be previewed in real time. This aids the user in composing a sequence of images displayed in a digital viewfinder or captured as a video.

In another aspect, the present invention provides an image processing device, comprising a receiver operable to receive an image and an imaging effect parameter, the imaging effect parameter defining an imaging effect to be performed on the image; an image processor operable to perform the imaging effect on the image, using the imaging effect parameter, to produce a final image; and a final image output device operable to output the final image.

Advantageously, an imaging effect may thus be applied to an image using nothing except the predetermined imaging effect parameter associated with the image. No input from the user is required, improving the convenience for the user.

In embodiments, the receiver may receive the image and imaging effect parameter from a remote device. Advantageously, this allows the first image and imaging effect parameter to be received from a device which may be less suitable for the processor intensive task of performing an imaging effect on the image. The work flow of performing the imaging effect on the image is thus made more efficient.

In embodiments, the image and imaging effect parameter may be received over a computer network. Advantageously, this allows the image and imaging effect parameter to be transmitted using existing computer network infrastructure, improving the convenience for the user.

In another aspect, the present invention provides a system comprising a first image processing device, comprising an image receiver operable to receive a first image; an image converter operable to convert the first image to a second image, the second image being a smaller-sized representation of the first image; an image pre-processor operable to perform an imaging effect on the second image to form a third image, the imaging effect being defined by an imaging effect parameter; a first output device operable to output the third image for display; and a second output device operable to output the first image and the imaging effect parameter; and a second image processing device, comprising a receiver operable to receive the first image and the imaging effect parameter; an image processor operable to perform the imaging effect on the first image, using the imaging effect parameter, to produce a final image; and a final image output device operable to output the final image.

Advantageously, the first image processing device allows a user to quickly and easily preview the imaging effect on the second image, which is a smaller-sized representation of the first image. At the same time, the full-size first image and imaging effect parameter, which defines the imaging effect, are passed to the second image processing device, so that the imaging effect can be applied to the full-size first image. A high quality, full resolution image with the imaging effect applied can thus still be obtained.

In embodiments, the first and second image processing devices may be remotely located from each other, and the second output device of the first image processing device may transmit the first image and imaging effect parameter to the receiver of the second imaging processing device.

Advantageously, this allows the first and second image processing devices to be or to be comprised within suitable devices within suitable locations. For example, the first image processing device could be comprised within a camera located on a film set and the second image processing device could be comprised within a studio control room in a different location. The different tasks of the first and second image processing devices are thus delegated to the most suitable devices and locations, improving the efficiency of the image processing work flow.

In embodiments, the first image and imaging effect parameter may be transmitted over a computer network. Advantageously, this allows the first image and imaging effect parameter to be transmitted using existing computer network infrastructure, improving the convenience for the user.

Referring now to the drawings, wherein like reference numerals designate identical or corresponding parts throughout the several views.

FIGS. 1-4 demonstrate an example of a visual effect, also known as an imaging effect, which may be applied to images in embodiments of the present invention. Specifically, FIGS. 1-4 demonstrate an imaging effect which corrects for the convergence of vertical lines in the image.

FIG. 1 illustrates a user 100 using a camera 105 to capture an image of an object 110 such as a building. The object 110 comprises a surface 115 which extends in a substantially vertical direction from the ground 120. It is noted that in order to capture the entirety of the object 110 in an image, the user 100 is required to tilt the camera 105 upwards.

Figure 2:
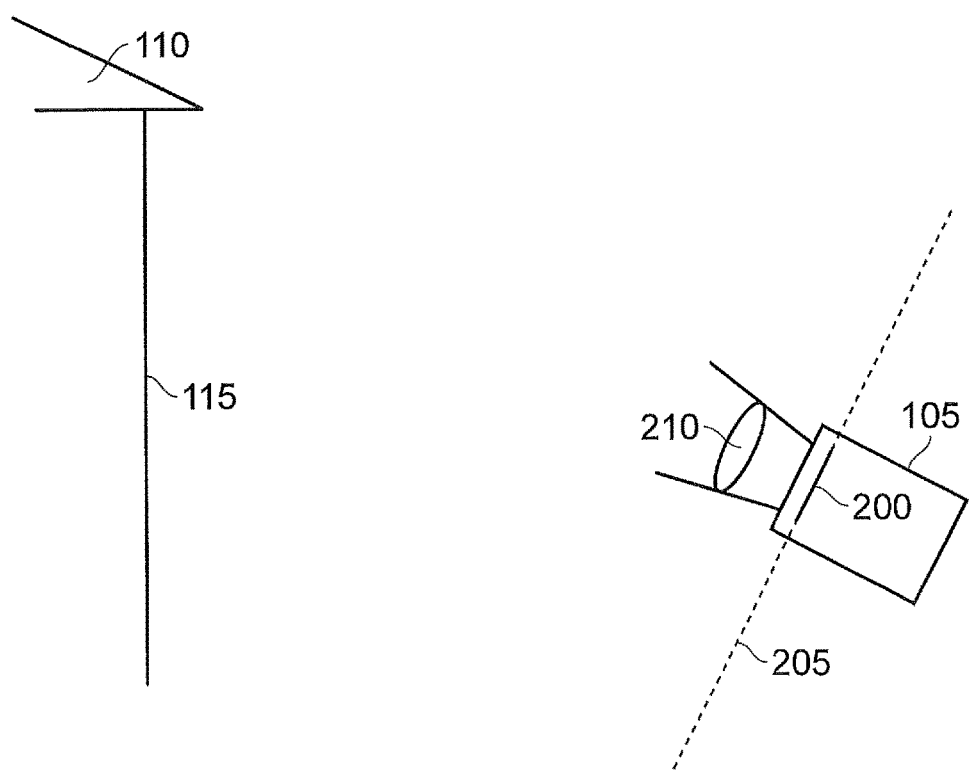
FIG. 2 describes an image sensor of the camera being tilted with respect to the surface of the tall object.

FIG. 2 illustrates the tilting of the camera 105 in more detail. It can be seen that the camera 105 comprises an image sensor 200, such as a charge-coupled device (CCD) or complementary metal-oxide-semiconductor (CMOS) sensor, which in combination with lens 210, allows a digital image of the object 110 to be captured. Specifically, the lens 210 focuses light received from the object 110 onto an image plane 205, and the image sensor 200 is positioned so as to be aligned with the image plane 205, thus allowing an image of the object 110 formed at the image plane 205 to be captured. It can be seen that because the camera 105 is tilted, the image plane 205 is not parallel to the plane defined by the surface 115 of the object 110.

Figure 3:
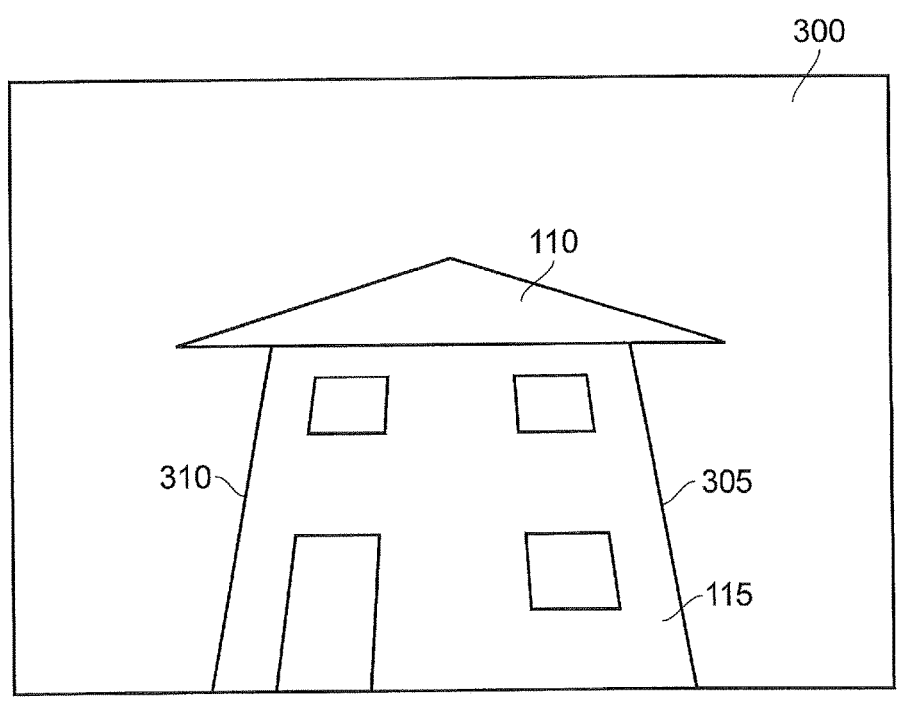
FIG. 3 describes an image captured by the camera in which vertical lines of the tall object appear to incorrectly converge.

The effect of the image plane 205 not being parallel to the plane defined by the surface 115 is shown in FIG. 3. FIG. 3 shows a captured image 300 of the object 110 as viewed from the perspective of the camera 105 when the camera is in the position illustrated in FIGS. 1 and 2. It can be seen that the surface 115 is bounded by two straight lines 305, 310 which form edges of the object 110. In reality, the lines 305, 310 extend in a vertical direction from the ground 120 and are parallel to each other. However, because of the tilt of the camera 105, the lines 305, 310 in the image appear non-parallel. Rather, the lines 305, 310 appear to converge. This can be an undesirable effect, because it incorrectly makes the object 110 in the image 300 appear to be leaning backwards.

Such an effect can be avoided by using a special shift lens with the camera 105, which allows the image plane to be shifted with respect to the image sensor 200 whilst the camera 105 remains stationary. This allows the entirety of the object 110 to be captured by the camera 105 without having to tilt the camera 105 upwards. The image plane 205 can thus be kept parallel to the plane defined by the surface 115 of the object 110, and therefore the convergence of the lines 305, 310 in the image 300 is avoided. Special shift lenses are, however, very expensive and may have other associated problems. Fortunately, the convergence of the lines 305, 310 can be corrected digitally instead during post-processing, by performing an imaging effect on the image 300.

Figure 4:
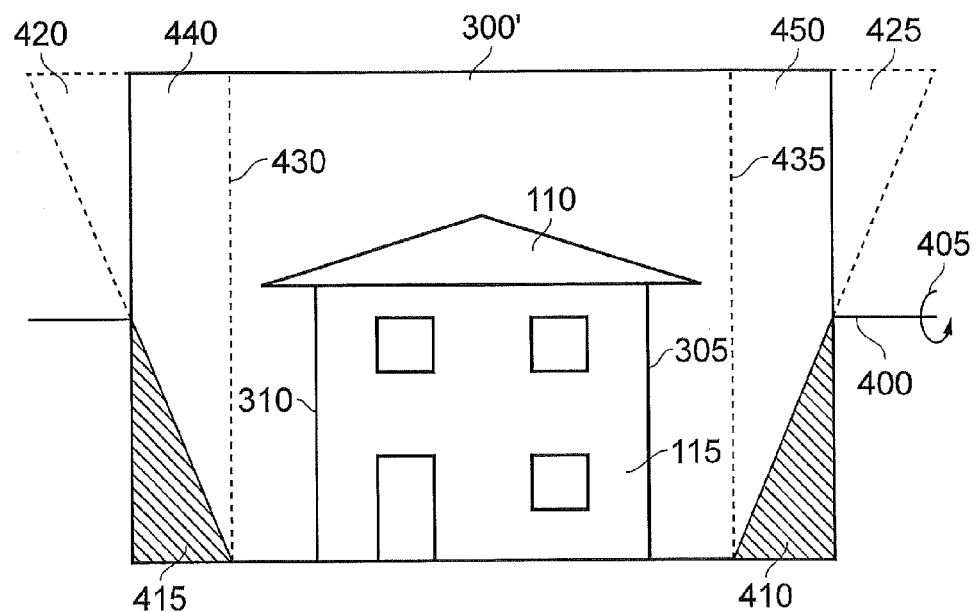
FIG. 4 describes a shift correction imaging effect which can be applied to the image in order to correct for the convergence of the vertical lines.

The result of performing an imaging effect to correct for the convergence of lines 305, 310 on the image 300 is illustrated in FIG. 4. Here, a corrected version of the image 300' is shown. It can be seen that the image has been corrected so that lines 305, 310 are now parallel and do not converge. Specifically, the image 300' has been formed by digitally rotating the image 300 in three-dimensional (3D) space so as to change the perspective of the image. In FIG. 4, the axis 400 about which the image 300 was rotated to form image 300', together with the direction of rotation 405, is shown. It is noted that the position of the axis 400 could be vertically offset in an upwards or downwards direction and still define an axis about which the image 300 can be rotated for perspective correction.

Digitally rotating an image in 3D space to change the perceived perspective of the image is known in the art. For example, it is an effect that can be applied to an image using imaging editing programs such as Adobe® Photoshop®.

For any given image 300, the image may be corrected by considering one of the lines 305, 310 and changing the perspective of the image 300 until that line becomes truly vertical. Example methods of analysing the lines in a captured image for the purpose of line convergence correction are discussed later. Because of the rotation of the image 300 to form the corrected image 300' and the fact that it is desirable for the corrected image 300' to occupy the same rectangular shape with the same dimensions as that of the original image 300, it can be seen that the corrected image 300' comprises blank portions 410, 415 and cropped portions 420, 425. The blank portions 410, 415 arise in regions of the image which appear to move away from view as the image is rotated. On the other hand, the cropped portions 420, 425 arise in regions of the image which appear to move closer as the image is rotated and which exceed the boundaries of the rectangular frame of the original image. As discussed above, these portions, in particular the cropped portions 420, 425 can cause problems to the user 100 capturing the original image 300, since the user 100 may be unsure as to which areas of the image 300 may be lost once the image is corrected during post-processing.

The problem in which the user is unsure as to which areas of the image 300 may be lost may be made even worse if the corrected image 300' is further cropped and scaled so as to remove the blank regions 410, 415 and restore the image so that it once again becomes rectangular in shape. For example, as illustrated in FIG. 4, the corrected image 300' could be cropped along the dotted lines 430, 435 so that portions 440, 450 containing the blank regions 410, 415 are removed and an image with a rectangular shape is obtained. It is very difficult for a user to predict the extent of the regions 440, 450 which will be cropped from the image during post-processing, and there is therefore a risk that important features in the regions 440, 450 of the image may be lost.

If the user 100 is capturing a still image 300, it is therefore desirable to provide the user 100 with a preview of the image, with the convergence correction applied, before the original image 300 is captured and stored. That is, the user is provided with a preview of the corrected image 300' in real time, before the original image 300 is captured and stored. The preview image may be displayed to the user 100 in a live-view format using, for example, a screen on the camera 105 which acts as a digital viewfinder. Similarly, if the user 100 is capturing a video, in which each frame of the captured video is equivalent to an image 300, it is desirable to provide the user with a preview of the video, with the convergence correction applied to each frame, whilst the video is being captured and stored. That is, the user is provided with a preview of the corrected image 300' in real time for each captured image 300 which forms a frame of the video. Again, the preview video may be displayed to the user 100 in a live-view format using, for example, a screen on the camera 105 which acts as a digital viewfinder.

The problem with performing the correction on a captured image 300 in real time is that this is a very processor intensive task. This is particularly true for the high resolution photo and video cameras which exist today. There is therefore a danger that the processing for correcting a particular image 300 will take too long, resulting in a time-lag between the user capturing an image 300 and the user being able to view a preview of that image with the correction applied. This can result in the user composing an image incorrectly during image capture and not being able to realise that the composition is incorrect until later on.

Although the image may be re-captured in certain circumstances, this is often not possible. For example, when filming a fast-moving sport such as soccer, a user may have only one chance to capture an image of a particular event such as a goal being scored. The present invention aims to alleviate this problem, so that captured high resolution images can have correction applied to them and can be previewed by the user in real-time, without a significant time lag.

Figure 5:
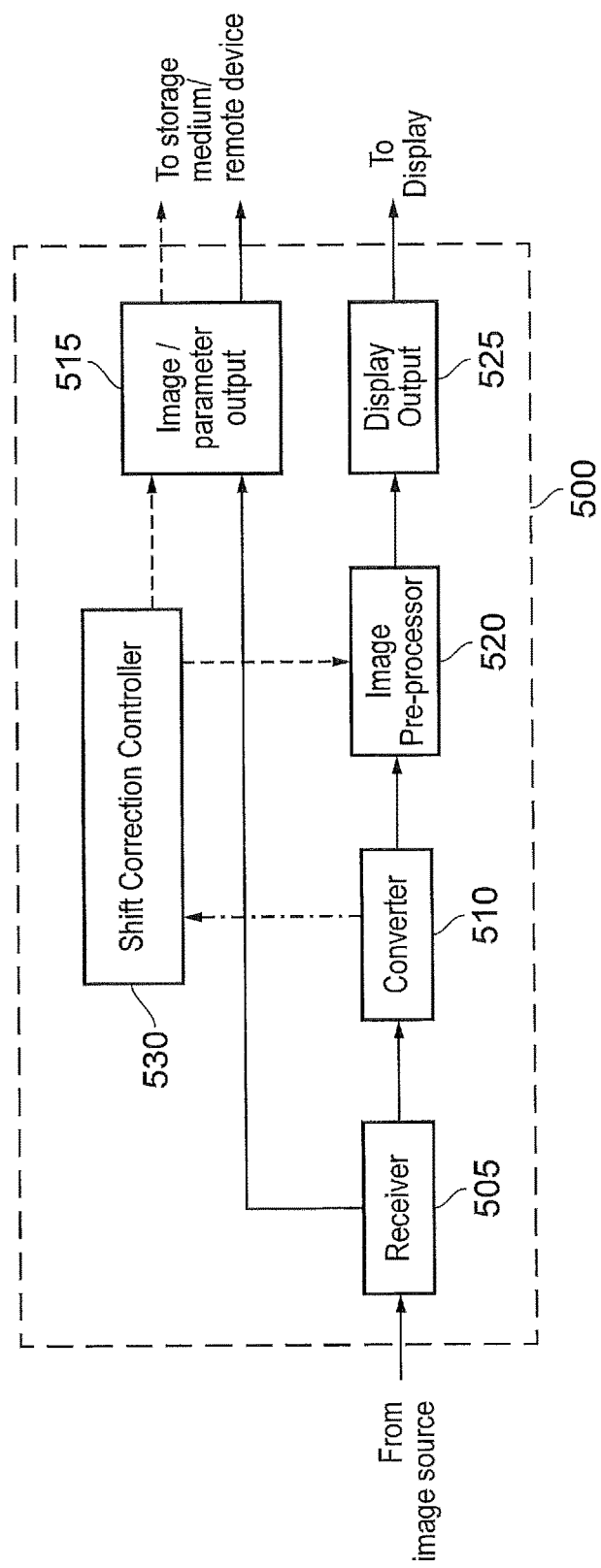
FIG. 5 describes an imaging processing device for generating a preview image with shift correction applied according to an embodiment of the present invention.

FIG. 5 illustrates an image processing device 500 according to an embodiment of the present invention. The device 500 comprises a receiver 505 which receives an image 300 from an image source. In this example, the image 300 has been captured using the camera 105. However, it will be appreciated that the image 300 may be obtained from another source. For example, the image 300 may have been captured at an earlier time and may be stored on a storage device such as a hard disk drive or a flash memory.

The image 300 is then passed to both a converter 510 and to an image/parameter output 515. Each of these paths of the image 300 are considered separately. In FIG. 5, solid lines indicate the path of the image 300 which is being processed. Dashed lines indicate the path of non-image, parameter data related to the image 300. The dot-dash line indicates an optional path for the image 300.

When the image 300 is received at the converter 510, processing is performed on the image 300 so that it is converted to a smaller-sized representation of itself. For example, if the image 300 is in a standard uncompressed data format, then the image 300 could be easily converted to a lower resolution image, so that it is represented by a smaller number of pixels. This can be achieved by interpolating pixels of the image 300 at its original resolution. The smaller-sized representation of the image 300 is smaller-sized in that the same image is represented by a smaller amount of information. For example, a 30 MB image can be converted to a 4 MB image. Because the resulting smaller-sized representation of the image 300 (which may be referred to as the smaller-sized image) is represented by a smaller amount of information, less processing is required for applying an imaging effect, such as line convergence correction, to the smaller-sized image when compared to that required for the original image 300.

Once the converter 510 has converted the image 300 to a smaller-sized image, the smaller-sized image is passed on to the image pre-processor 520. Here, a suitable imaging effect is applied to the smaller-sized image. So, for example, if line convergence correction is required, such as that illustrated in FIG. 4, the image pre-processor 520 performs the line convergence correction processing on the smaller-sized image. Line convergence correction may also be referred to as shift correction, due to it traditionally being performed using a shift lens.

In the embodiment shown in FIG. 5, shift correction processing is performed on the smaller-sized image. In order to perform the shift correction, the image pre-processor requires extra information in order to determine how to correct the image. This extra information is provided in parameter form by shift correction controller 530. The shift correction controller 530 provides one or more imaging effect parameters, depending on what information is required by the shift correction method implemented by the image pre-processor 530. So, for example, if the shift correction method illustrated in FIG. 4 is used, in which the image is rotated in 3D space to compensate for the tilt of the image sensor 200, then the shift correction controller 530 may provide a numerical value indicating the angle by which the image is to be rotated as the imaging effect parameter.

The shift correction controller 530 may compute the imaging effect parameter in any suitable way. For example, the shift correction controller 530 could comprise a manual controller (not shown) through which the user is able to manually select the extent of shift correction of the image. So, for example, if the shift correction method of FIG. 4 is used, then the user may use a manual controller of the shift correction controller 530 to select an angle of rotation of the image. The manual controller could comprise a dial, button or touch screen, for example.

Alternatively, the shift correction controller 530 could automatically generate an imaging effect parameter for the shift correction. An imaging effect parameter may be automatically generated using any suitable method, such as through the use of an accelerometer or gravimeter in the camera 105 (not shown) which captures the original image 300 or through the use of edge detection (also known as line detection) in the image. In the former example, a gravimeter may generate an angle indicating the amount of tilt of the image sensor 200 with respect to the gravitational vertical. This angle may then be used to determine the extent of shift correction on the image, with larger angles indicating that a larger amount of shift correction is required. In the latter example, a vertical or horizontal edges which are detected in the image may be used as a reference for performing the shift correction. An imaging effect parameter, such as an angle indicating the rotational offsets of the detected edges with respect to the true vertical or horizontal, may then be generated by the shift correction controller 530. This allows shift correction to be performed on the image by rotating the image in 3D space until the rotational offset of the detected edge is removed. The edge detection correction technique is described in more detail later on.

In the embodiment of FIG. 5, the edge detection processing is performed on the smaller-sized image generated by the converter 510, which reduces the processing effort required when compared to performing the edge detection processing on the larger original image 300. It is conceivable, however, that the edge detection could instead be performed on the larger original image 300.

After the smaller-sized image has been processed, the smaller-sized image is passed to display output 525. The display output is operable to output the smaller-sized image, with the imaging effect applied to a display device (not shown). The display device may be any suitable device for displaying the smaller-sized image as a preview image to the user. For example, the display device could be a computer monitor, a television or a preview screen integrated as part of the camera 105 or mobile computing device. When an image 300 is received by the receiver 505, it is also sent to the image/parameter output 515. The image 300 sent to the image/parameter output 515 is the full-sized, original image received by the receiver 505. The one or more imaging effect parameters generated by the shift correction controller 530 for the smaller-sized representation of the image 300 are also sent to the image/parameter output 515. The image/parameter output 515 then outputs the image 300 and the associated imaging effect parameter(s). Although the display output 525 and image/parameter output 515 are illustrated as separate components in the embodiment of FIG. 5, they may also be comprised within a single output. In this case, the preview image data and the full image/parameter data may be multiplexed together. In some embodiments imaging effect parameters might be applied to the image before outputting the combined image.

As will be explained later, the image 300 and its associated imaging effect parameter(s) may be stored together in a storage medium for further processing at a later time. Alternatively, they may be sent together to a remote device for further processing. The imaging effect parameter(s) associated with the image 300 defines the shift correction that is to be applied to the image 300. This will be the same shift correction that was applied to the smaller-sized representation of the image 300 by the image pre-processor 520. The further processing of the image 300 and its associated imaging effect parameter(s) involves performing shift correction processing on the image 300 so that the full-sized, original image 300 may be shift corrected to match the correction of the smaller-sized preview image.

In embodiments, the receiver 505 may receive a sequence of images at a predetermined frame rate. For example, the images received at the receiver 505 may be captured from the camera 105 at a predetermined frame rate and provided to the receiver 505 in real time. The sequence of images is then pipelined through the device 500. The frame rate may be a frame rate that is used for video capture, for example, 24, 50, 60, 100 or 200 frames per second.

The sequence of captured images may be stored as a video. In this case, for each image 300 in the sequence of images, the image 300 is sent to the converter 510 to be converted to a smaller-sized image. Shift correction is then performed on the smaller-sized image by the image pre-processor 520, using one or more imaging effect parameters generated by the shift correction controller 530. The smaller-sized image, with shift correction applied, is then output by the display output 525. At the same time, the original image 300 is sent to the image/parameter output 515. The one or more imaging effect parameters generated by the shift correction controller 530 are also sent to the image/parameter output 530. The original image 300 is then output, together with the one or more imaging effect parameters, to a storage medium or to a remote device for shift correction to occur at a later time.

Alternatively, the sequence of captured images may simply be displayed to the user without necessarily being stored. In this case, a display which receives images from the display output 525 may act as a live-view electronic viewfinder of the camera 105. For each image 300 in the sequence of images, the image 300 is again processed by the converter 510 and image pre-processor 520 and output by the display output 525. Also, the original image 300 and the one or more imaging effect parameters are again sent to the image/parameter output 530. This time, however, the original image 300 and associated imaging effect parameter(s) are not automatically output by the image/parameter output 515. Rather, the image 300 and imaging effect parameter(s) are temporarily held in a memory of the image/parameter output 515 (not shown).

The image 300 and imaging effect parameter(s) may be output by the image/parameter output 515 in response to a command issued by the user. This command could be issued by the user by pressing a shutter button on the camera 105, for example. If the command is issued by the user, then the image that is currently being output by the display output 525 (in preview form) and that is currently also being held in the memory of the image/parameter output 515 (in full-size form) is output by the image/parameter output 515 to a storage device and/or a remote device, together with the associated imaging effect parameter(s). Alternatively, if the command is not issued by the user before the next image in the sequence is received by the image/parameter output 515, then the image 300 and imaging effect parameter(s) are overwritten in the memory of the image/parameter output 515 by the data associated with the next image.

Once the command has been issued by the user and the current image has been output by the image/parameter output 515, the device can return to its original state in which the preview images are output for display but in which the original images 300 and parameter(s) are not stored. This allows a still image to be captured. Alternatively, the device can change, in response to the command being issued by the user, to a video storage mode. Here, for all subsequently received images, both a preview image is displayed and the original image 300 and parameter(s) are stored. The device thus allows a video to be recorded from the moment that the command is issued by the user.

Figure 6:
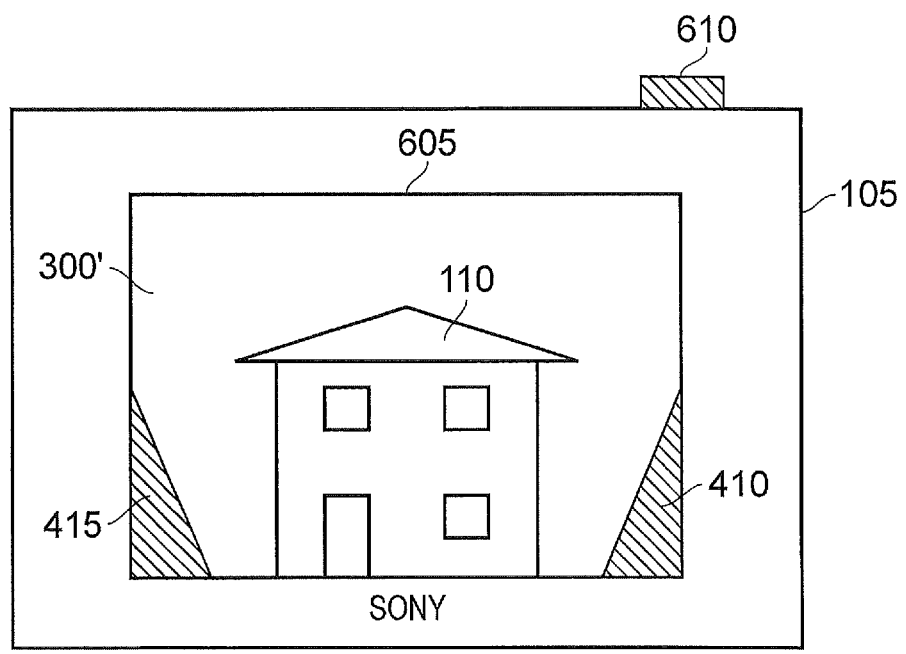
FIG. 6 describes a camera comprising the image processing device for generating the preview of the shift corrected image.

For both the video capture and live-view embodiments, for each image 300 in the sequence, the amount of information used to represent the smaller-sized image should be chosen such that the image pre-processor 520 is able to apply the imaging effect in real time at the frame rate at which the images are received. That is, the image pre-processor 520 should be able to apply the imaging effect to each image in the sequence in a sufficiently small amount of time such that the time-lag between the receiver 505 receiving an image 300 and the display output 525 outputting a preview image is less than or equal to the time period between successive image frames. This allows a user to preview each shift corrected image in the captured image sequence in real time, allowing them to correctly compose still images or video images which have been shift corrected and which may therefore have blank or cropped image portions. The display of the preview image is illustrated in FIG. 6, which shows the camera 105 when it comprises the image processing device 500 (not shown in FIG. 6). Here, the camera 105 also comprises an integrated display 605 which receives the processed preview images from the display output 525. A preview of the shift corrected image 300' of the object 110, with blank portions 410, 415 and cropped portions (not shown), is shown on the display 605. This is a live-view preview image of the object 110, in which images are being captured by the camera 105 and sent to the image processing device 500 for processing and display in real time. Because a preview of the corrected image 300' can be seen, the user is able to compose the image correctly by ensuring that all objects they wish to capture do not fall within the cropped portions.

The camera 105 comprises shutter button 610. As described above, the shutter button 610 is pressed to issue a command to store the full-size captured image 300 and associated imaging effect parameter(s) related to the preview image currently being displayed on the display 605. After the shutter button 610 has been pressed, the camera 105 can continue to display preview images only, that is, without storing the images and parameter data. Alternatively, the camera 105 can enter a video mode and can both display preview images and store the images and parameter data.

It will be appreciated that although FIG. 6 shows a consumer camera 105 in which the image processing device 500 is integrated, the image processing device 500 could also be used as a standalone unit. For example, the image processing unit 500 could be a standalone unit designed for use with a professional video camera such as a Sony PMW-F55 or PMW-F5 CineAlta 4K camera. In this case, video images captured by the camera are fed to the receiver 505 of the device 500. The two separate resulting video feeds, one being output by the display output 525 and the other being output by the image/parameter output 515, may then be respectively fed to a preview screen of the camera and to a video storage device of the camera. The preview screen and video storage device each may or may not be comprised within the camera itself.

Alternatively the image processing device 500 may be integrated within a tablet (such as the Sony Xperia® Z tablet) or smartphone (such as the Sony Xperia® Z smartphone). In this case, the image processing device 500 may be implemented in the tablet or smartphone as software, for example as a downloadable software application (or "App").

Figure 7:
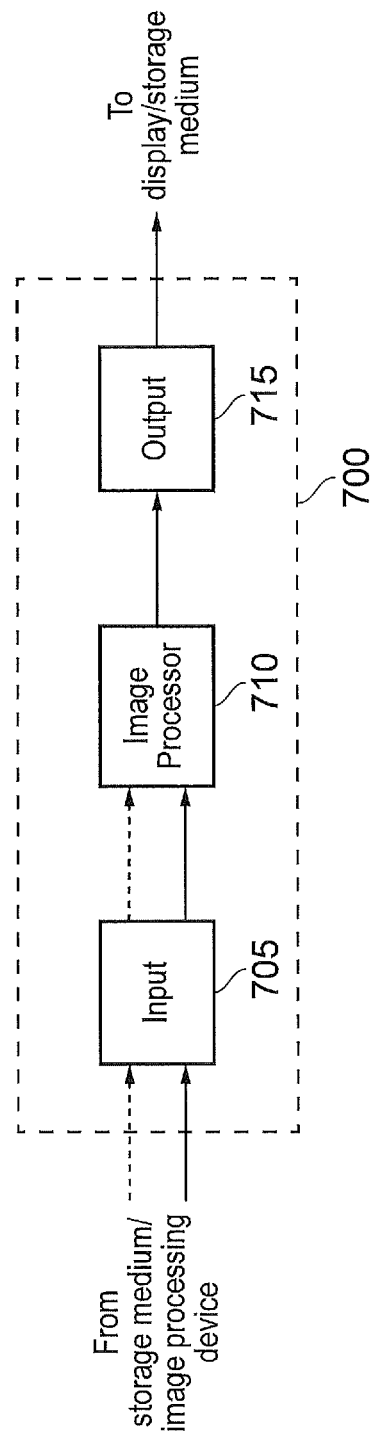
FIG. 7 describes an image processing device for performing the shift correction applied to the preview image on the original image according to an embodiment.

Once the full-size image 300 and associated imaging effect parameter(s) have been stored or sent to a remote device, the imaging effect which was performed on the smaller-sized image can be applied to the full-size image 300. This can be achieved using image processing device 700, as illustrated in FIG. 7. Again, in FIG. 7, solid lines indicate the path of the image 300 which is being processed. Dashed lines indicate the path of non-image, parameter data related to the image 300.

The full-size original image 300 and associated imaging effect parameter(s) are received at the input 705. The input 705 may also be referred to as a receiver. The image 300 and parameter(s) may be received from a storage device (not shown) or they may be received directly from the image/parameter output 515 of the image processing device 500. In the latter case, the image processing device 700 may act as a remote device to which the image 300 and parameter(s) are sent. The image 300 and parameter(s) are then sent to image processor 710. The image processor 710 performs an imaging effect on the image 300. This is the same imaging effect which was performed on the smaller-sized representation of the image 300 by the image pre-processor 520. So, for example, the imaging effect may be a shift correction of the image 300. The imaging effect is performed on the image according to the imaging effect parameter(s). Once the imaging effect has been applied to the image 300, the processed image 300' is passed to the output 715. The output 715 may then output the processed image 300' to a device such as a storage device or to a display.

Through the combination of the image processing devices 500, 700, a user may therefore capture an image 300 and preview an imaging effect on a smaller-sized representation of that image in real time. This allows the user to compose the image 300 correctly as it is captured. The same effect can then be applied to the full-size version of the image 300 at a later time. Full-size, correctly composed images 300' with an imaging effect applied can therefore be obtained more easily by the user with embodiments of the present disclosure.

The image processing devices 500, 700 can be combined using any suitable method which allows image and parameter data output by the image/parameter output 515 of the device 500 to be received by the input 705 of the device 700. Example embodiments are illustrated in FIGS. 8A-8D.

Figure 8A:
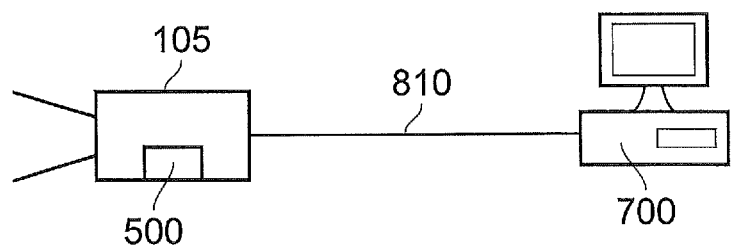
FIGS. 8A-8D describe various methods of connecting image processing devices to form a system according to embodiments of the present invention.
Figure 8B:
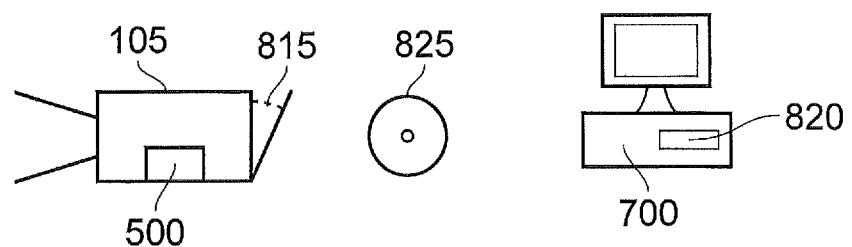

In FIG. 8A, the image processing device 500 is comprised within a camera 105. The full-size images 300 and parameters are transmitted to the image processing device 700 via a direct connection 810. The direct connection 810 may be a wired or wireless connection. Examples of suitable wired connections could include a USB, FireWire, HDMI or ethernet connection. Examples of suitable wireless connections could include a Wi-Fi, Bluetooth, Infra-Red (IR), Radio Frequency (RF) or optical connection. A wireless connection could be established using the Digital Living Network Alliance® (DNLA) wireless standard. In FIG. 8B, the image processing device 500 is comprised within a camera 105. The camera 105 also comprises a portable storage medium drive 815 into which a portable storage medium 825 may be inserted. The full-size images 300 and parameters are recorded to the portable storage medium 825. The portable storage medium 825 can then be removed from the portable storage medium drive 815 of the camera 105 and inserted into a portable storage medium drive 820 of the image processing device 700, thus allowing the device 700 to have access to the full-size images 300 and parameters. Any suitable portable storage medium 825 could be used. Examples include an optical disc, such as a compact disc (CD), digital versatile disc (DVD) or Blu-Ray disc (BD), or a portable flash memory device, such as a Memory Stick, Secure Digital (SD) card or CompactFlash (CF) card.

Figure 8C:
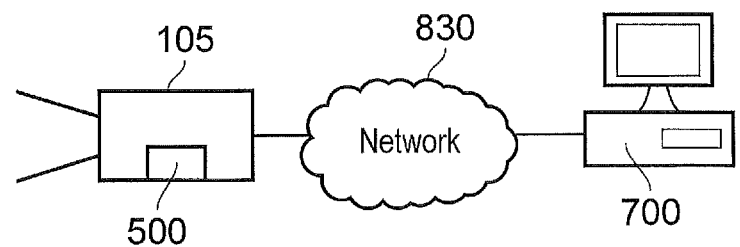

In FIG. 8C, the image processing device 500 is comprised within a camera 105 which is operable to connect to a computer network 830. The image processing device 500 is able transmit the full-size images and parameters to the image processing device 700 over the network 830. The network 830 could be a local computer network or it could be the internet.

In the embodiment of FIG. 8C, there could be a plurality of image processing devices 700 which together process a stream of full-size images 300 received from the image processing device 500. In this case, a plurality of images received from the device 500 could be processed in parallel, with each of the images being processed by a different device 700. Advantageously, a user is thus able to capture images using the camera 105 and view a preview of the captured images, with an imaging effect applied, in real time. The workload of then applying the imaging effect to each of the captured full-size images is then offloaded to the plurality of devices 700 via the network 830. Such an arrangement may be known as cloud processing of the captured images.

It is noted that although the image processing device 500 is comprised within a camera 105 in FIGS. 8A-8C, the device 500 could instead be a standalone device. In this case, it would be the device 500 itself which has the direct connection 810 with the image processing device 700, which stores data onto the portable storage medium 825 or which communicates with the image processing device 700 via the network 830. In this case, the device 500 could be connected to a camera 105 in order to obtain the images 300.

Figure 8D:
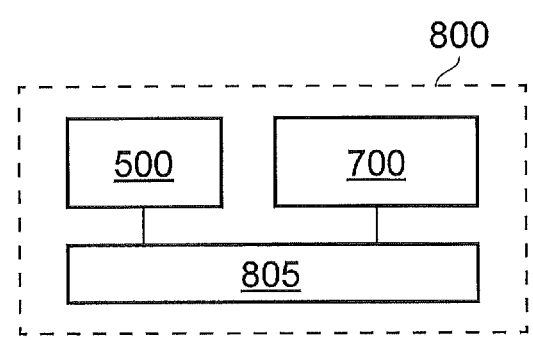

In FIG. 8D, the devices 500, 700 are combined within a single device 800. This single device could be integrated within or connected to a camera 105, allowing a user to preview images in real time as they are captured and, at the same, allowing the full-size images to be queued and processed. In this embodiment, each of the devices 500, 700 are connected to a storage medium 805. The device 500 generates full-size images 300 and associated imaging effect parameter(s) for each image. The images and parameter(s) are stored in the storage medium 805. The device 700 then performs an imaging effect on each of the full-size images 300 using its associated imaging effect parameter(s). The full-size images, with the imaging effect applied, are then stored in the storage medium. Using this embodiment, images can be captured and previewed with the imaging effect applied. The full-size images, with the imaging effect applied, will then be available on the storage medium 805 at a later time, once the device 700 has finished processing the full-size images.

The one or more imaging effect parameters associated with each captured image 300 can take a variety of formats. For example, the parameter(s) associated with a particular image can be included in the image data itself as additional metadata. When the image processing device 700 receives the image 300, it extracts the metadata and can thus obtain the parameter(s) for performing the imaging effect. Alternatively, the image processing device 500 can send the image data and parameter(s) associated with the image 300 as separate data. In this case, the parameter(s) for each image must be stored and recorded in such a way that the imaging processing device 700 can look up the parameter(s) for a particular image during processing of that image. In this case, the parameter(s) for each image may be recorded in a look-up table, such as that shown in FIG. 9.

Figure 9:
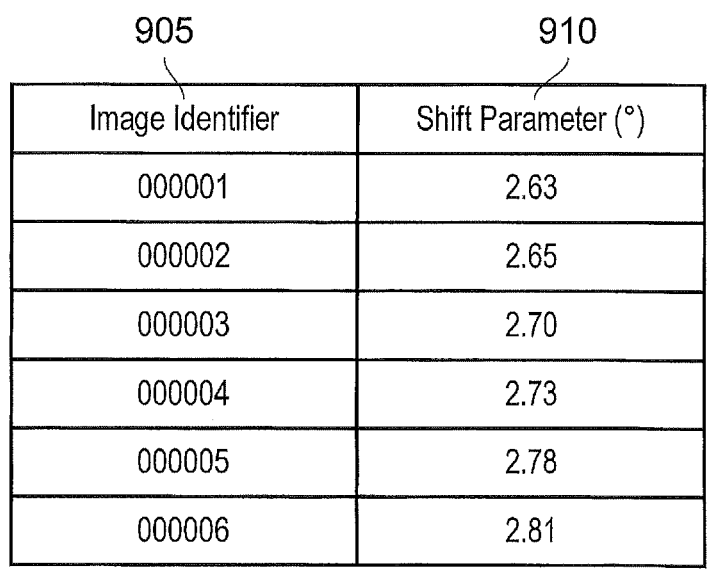
FIG. 9 describes a table recording a list of imaging effect parameters.

The table of FIG. 9 comprises a first column 905 listing identifying data which uniquely identifies each of the captured images 300. The identifying data could be, for example, a unique filename for each of the images, such as a unique numerical filename. It also comprises a second column 910 which lists an imaging effect parameter for each of the captured images 300. In this particular example, the shift parameter for each image is an angle of rotation (in degrees) for correction of the image according to the shift correction method of FIG. 4.

A look-up table, such as that of FIG. 9, may be generated by the image processing device 500 and transmitted to the image processing device 700. This could be the case in the embodiment of FIG. 8B, for example, where the look-up table could be recorded to the portable storage medium 825 along with the image data. It could also be the case in the embodiment of FIG. 8D, where the look-up table could be recorded to the storage medium 805 along with the image data.

Figure 10A:
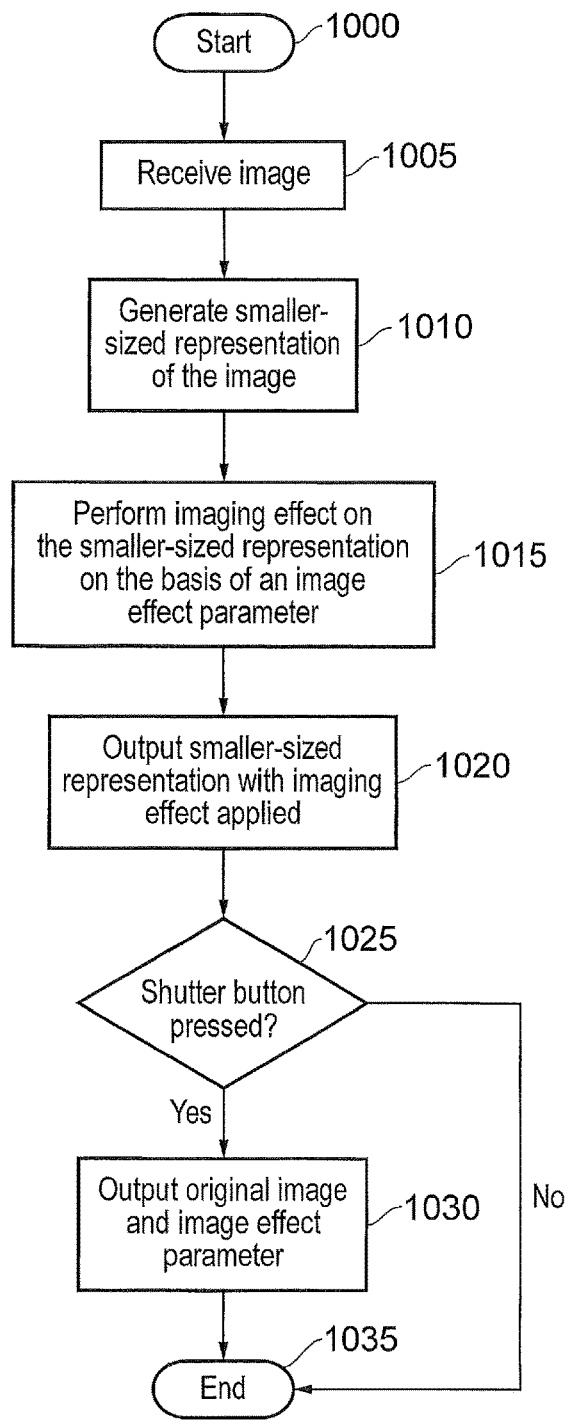
FIG. 10A describes a process for generating a preview image with shift correction applied.

Alternatively, the table of FIG. 9 may be generated by the image processing device 700 as it receives a stream of captured images 300 and a parameter for each image. For each image received, the image identifying data and the parameter are recorded in the table as the image joins the queue for processing. This could be the case in the embodiments of FIG. 8A or 8C, for example, in which a constant stream of images and associated parameters may be transmitted from the device 500 to the device 700. FIG. 10A illustrates a flow chart demonstrating the process carried out by the image processing device 500. The process starts at step 1000. At step 1005, the device 500 receives an image. At step 1010, a smaller-sized representation of the image is generated. At step 1015, an imaging effect is performed on the smaller sized representation of the image. The imaging effect is performed on the basis of an imaging effect parameter. An example of an imaging effect is a shift correction of the image. In this case, one example of the imaging effect parameter is the shift parameter 910 from FIG. 9. It is envisaged that any kind of imaging effect may be performed. For example, the image may be made transparent. In this case, the imaging effect parameter will be the required degree of transparency. The imaging effect parameter may therefore be seen as a parameter that defines the degree of image effect to be applied to the image.

At step 1020, the smaller-sized representation of the image, with the image effect applied, is output for display. At step 1025, it is decided whether or not a shutter button has been pressed. The shutter button may be pressed at an instant decided by the user so as to capture a still image or to begin the capture of a video sequence. If it is decided that the shutter button has been pressed, then the process moves onto step 1030, in which the original image and imaging effect parameter are output. The process then ends at step 1035. On the other hand, if it is decided that the shutter button has not been pressed, then the process simply ends at step 1035.

Figure 10B:
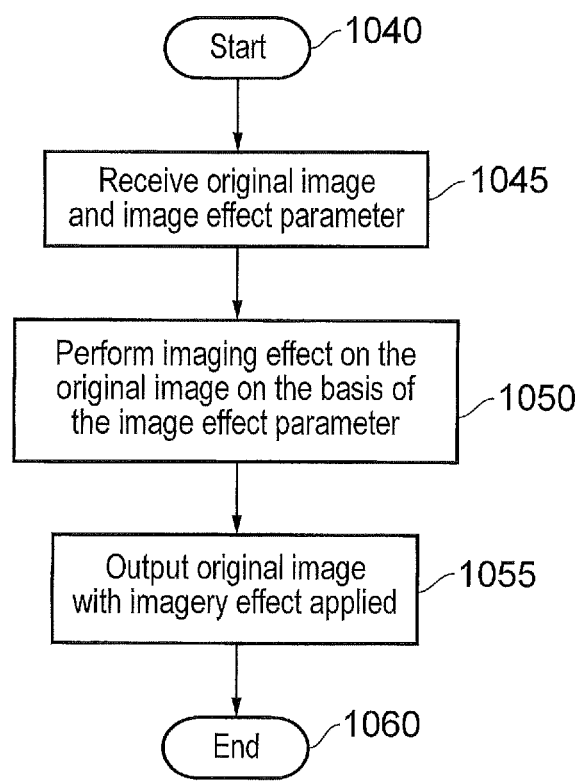
FIG. 10B describes a process for performing the shift correction on the original image.

FIG. 10B illustrates a flow chart demonstrating the process carried out by the image processing device 700. The process starts at step 1040. At step 1045, the original image and imaging effect parameter are received. At step 1050, an imaging effect is performed on the original image on the basis of the imaging effect parameter. An example of an imaging effect is shift correction of the image. At step 1055, the original image, with the imaging effect applied, is output. The process then ends at step 1060. Although the embodiments described so far perform a shift correction on the image 300 to correct for the convergence of vertical lines, it will be appreciated that shift correction for the convergence of horizontal lines could also be performed on the image 300. In this case, an imaging effect parameter for a captured image could be the value of an angle by which the image is rotated to correct for horizontal line convergence. The image 300 would, in this case, be rotated about an axis which is perpendicular to the axis 400 illustrated in FIG. 4. In embodiments, both vertical line shift correction and horizontal line shift correction may be performed on a single image.

Furthermore, as noted above, the present disclosure is not limited to shift correction as being the imaging effect that is applied to an image. Rather, any imaging effect, where it would be useful for a user to be able to preview the image effect in real time, may be applied by the image processing devices 500, 700. In the case of a different imaging effect being applied, the image pre-processor 520 of the device 500 would be configured to perform this different imaging effect instead of the shift correction as previously described. Similarly, the shift correction controller 530 of the device 500 would be replaced with a controller for generating imaging effect parameters relevant for the different imaging effect instead of generating shift correction parameters. The image processor 710 of the device 700 would then be configured to perform the different imaging effect on the original full-size images 300 on the basis of the different imaging effect parameters.

Examples of possible alternative imaging effects that could be applied using the present invention include the tilting of an image (digitally replicating the effect that can be achieved using a tilt lens), the overlaying of virtual objects on the image, the application of warping effects to the image, the editing of the colour or contrast of the image or the compensation for barrel or pincushion lens effects, vignetting or shading of the sky. Of course, these merely serve as examples and do not consitute limitations of the present invention.

Figure 11:
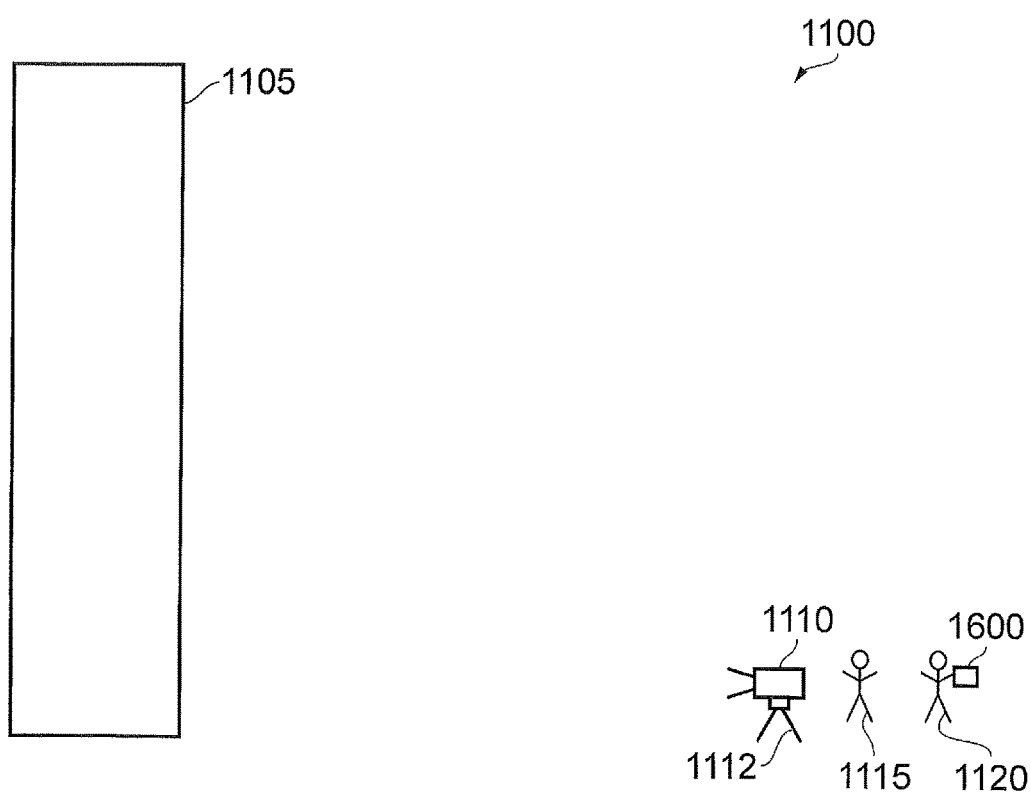
FIG. 11 describes a user capturing images of a tall object in a live camera shoot.

FIG. 11 shows a live camera shoot 1100. A camera 1110 in some embodiments is mounted on a tripod 1112. The tripod 1112 includes a tilt sensor (not shown) such as an accelerometer or gravimeter. The tilt sensor measures the amount of tilt (pitch) applied to the camera 1110. The tripod 1112 also includes a pan sensor (not shown) that measures the degree of panning (yaw) applied to the mounted camera. Roll in this example is assumed to be zero, with the tripod 1112 restricting the movement of the camera 1110 so that it cannot roll However, if the tripod 1112 is not set to prevent the roll of the camera, then the tripod 1112 could also include a roll sensor (not shown) that measures the degree of roll of the camera 1110. Typically, the pan sensor measures the degree of pan away from a centre line.

The camera 1110 is controlled by a camera operator 1115. In embodiments the camera operator 1115 is positioned close to the camera 1110, the camera operator 1115 may be located remotely from the camera 1110. The camera operator 1115 controls the operation of the camera 1110 by controlling the focus, zoom and position of the camera 1110.

A director of photography 1120 is also shown in FIG. 11. The director of photography is responsible for capturing the scene in a live camera shoot. The director of photography 1120 uses a tablet type computer 1600 such as a Sony® Xperia® Tablet. For security, the tablet computer 1600 asks the director of photography to identify himself or herself on the tablet and enter a password associated with the user. The tablet type computer is one example of a processing device. Other such devices include (but are not limited to) computers such as laptop computers, netbooks or smartphones such as Sony® Xperia® Z. The processing device according to embodiments is shown in more detail with reference to FIG. 16.

The tablet 1600 connects to the camera 1110 using a wireless connection. In particular, the tablet 1600 connects using the Digital Living Network Alliance® (DLNA) wireless standard. This enables the images captured by the camera 1110 to be transferred to the tablet 1600. The application of image processing, in embodiments, is then performed using the tablet 1600 before being displayed to the director of photography for review. Of course, the processing of the image captured using the camera 1110 may be performed in the camera 1110. Alternatively, the images may be partially processed in the camera 1110 with the remainder of the processing being provided in the tablet 1600. Indeed, as will be explained later in respect of FIG. 16, the tablet 1600 may be used to display the captured image prior to processing.

The live camera shoot 1100 involves the camera 1110 shooting a live action pan of a building 1105. As will be apparent from FIG. 11, the building 1105 is much taller than the camera 1110 and both the camera operator 1115 and the director of photography 1120.

Figure 12:
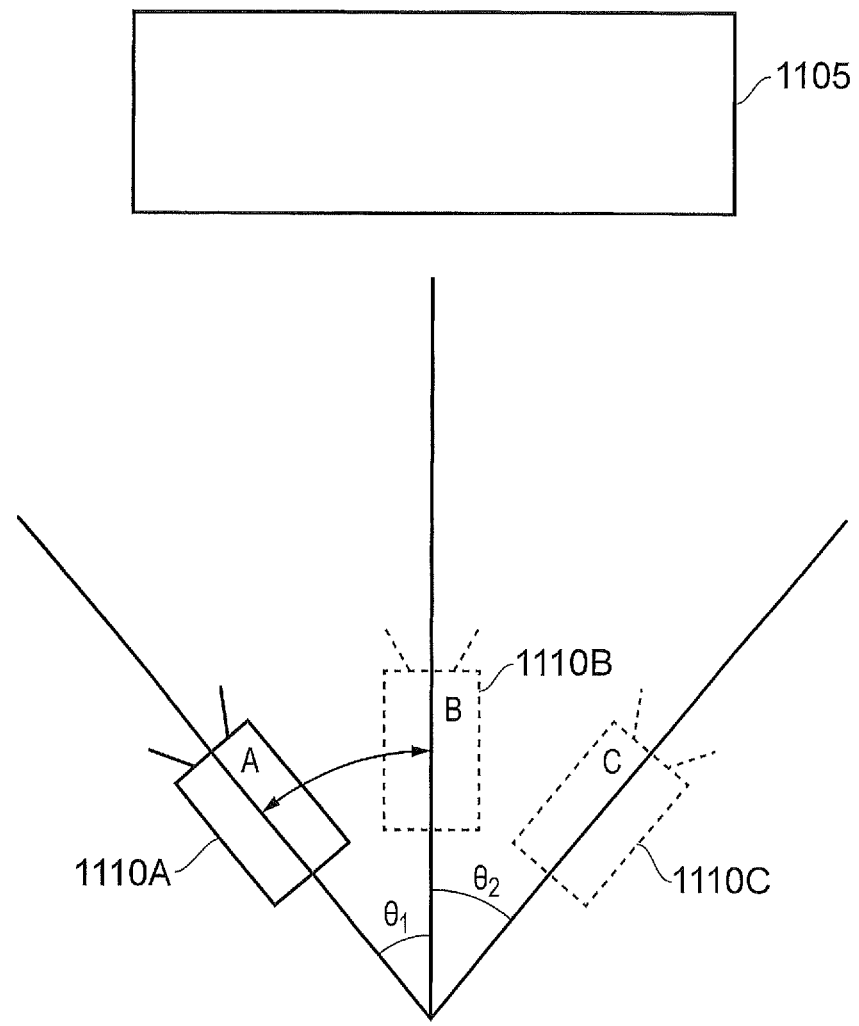
FIG. 12 describes capturing different images of the tall object with the camera in different positions.

FIG. 12 shows the pan of camera 1110. The camera 1110 is mounted on tripod 1112. Initially, camera 1110 is placed in position A. That is, the camera 110A is positioned at an angle $\theta_1$ relative to a line perpendicular to the building 1105. This is shown as 1110A is FIG. 12. The mounted camera 1110 then pans across the building to position C. When in position C, the camera 1110C is positioned at an angle $\theta_2$ relative to the line perpendicular to the building 1105. As will be apparent, during the pan from position A to position C the camera 1110 moves through an angle $\theta_1+\theta_2$.

When in position B, the camera 1110B directly faces the building 1105. In other words, when in position B, the camera 1110 faces the line perpendicular to the building 1105.

The panning motion between position A and position C may be smooth. That is, the angular velocity of the pan is constant for the entire pan between position A and position C. Alternatively, the angular velocity of the pan may vary between position A and position C. For example, the angular velocity of the pan between position A and position B may be higher than the angular velocity of the pan between position B and position C. Indeed, any speed in panning motion is envisaged.

Figure 13:
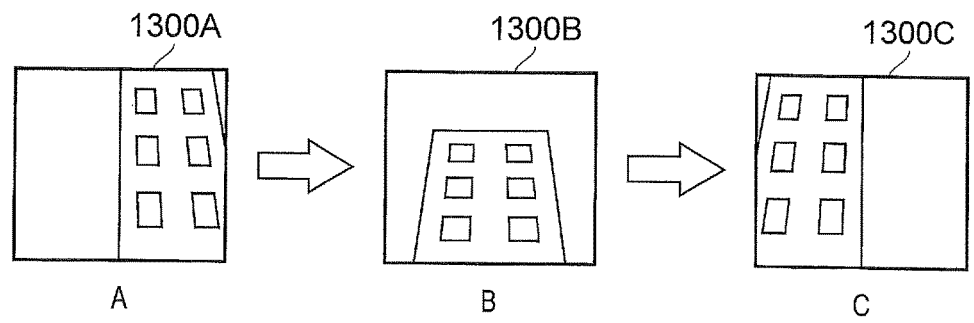
FIG. 13 describes the different images of the tall object that have been captured.

FIG. 13 shows an array 1300 of the field of view of the camera when located in position A, position B and position C respectively. Specifically, when located in position A, the field of view of camera 1110 is shown in 1300A. Moreover, when located in position B, the field of view of camera 1110 is shown in 1300B and when located in position C, the field of view of camera 1110 is shown in 1300C.

Referring to the field of view in position A 1300A, an edge of the building is shown. As the camera 1110 is positioned lower than the building, but is directed to the top of the building, the image plane of the camera 1110 is not parallel to the building. This results in an incorrect perspective. Specifically, the captured edges within the building are sloped rather than straight. As exemplified in FIG. 13, the walls and the windows of the building appear sloped. This incorrect perspective within a still image can be corrected by performing a shift correction using Adobe® Photoshop®. However, as noted hereinbefore, such a correction may crop the image undesirably.

Figure 14A:
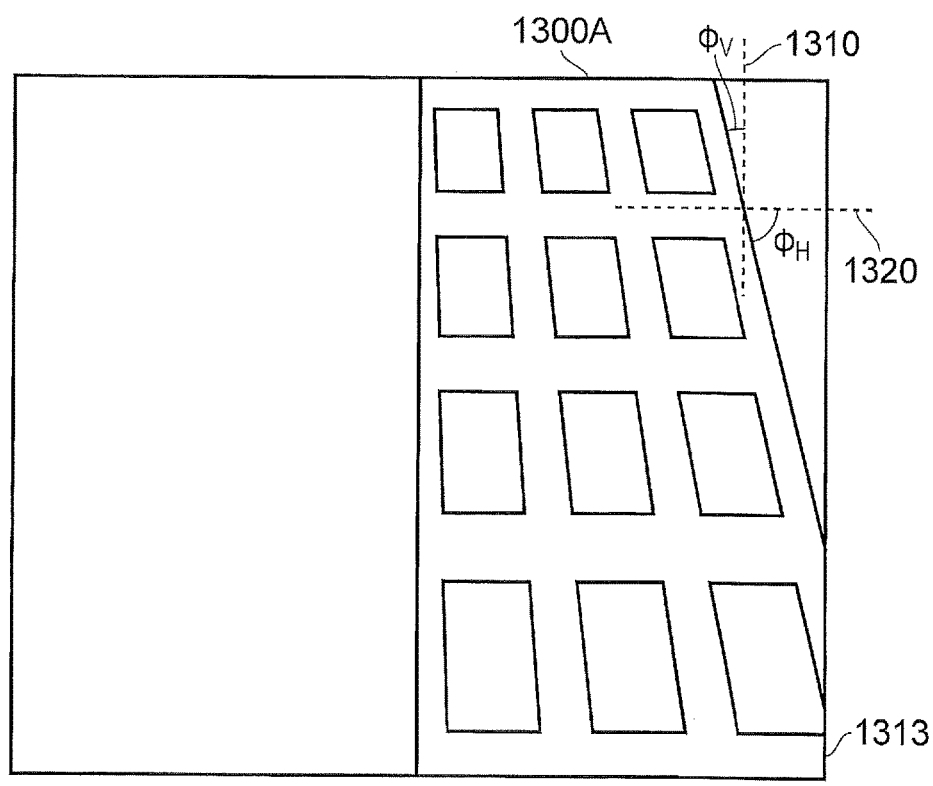
FIGS. 14A-14C describe the angular offset of lines in a captured image with respect to the vertical and horizontal.

FIG. 14A shows a more detailed representation of image 1300A from FIG. 13. As is indicated in FIG. 14A, the wall of the building is an angle of $\varphi_V$ from a straight vertical line 1310 and the roof is sloping at an angle of $\varphi_H$ from a straight horizontal line 1320. For ease of reference, the straight vertical line 1310 and the straight horizontal line 1320 are denoted by dashed lines in FIG. 14A. It should be noted here that the wall of the building is one example of a straight vertical edge and the roof of the building is one example of a straight horizontal edge. Other objects within the image include windows which have both straight vertical edges and straight horizontal edges. As will be explained later in respect of FIGS. 15A-15B, in embodiments of the disclosure, by determining $\varphi_V$ and/or $\varphi_H$ for edges in an image, it is possible to automatically determine which sloping edges should be vertical and/or which sloping edges should be horizontal, and to perform shift correction on the image accordingly.

Before discussing how shift correction may be performed in embodiments of the present invention, a number of considerations which must be taken into account when performing shift correction will be discussed with reference to FIGS. 14B and 14C.

Figure 14B:
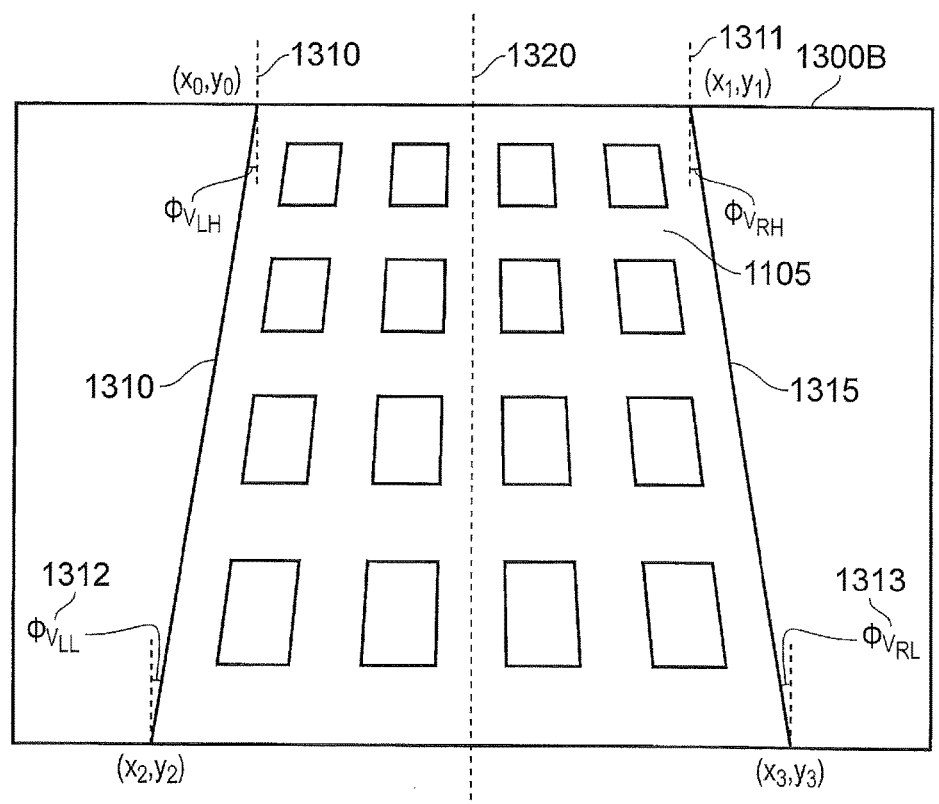

FIG. 14B shows a larger version of image 1300B from FIG. 13. It can be seen that vertical line convergence occurs in the image, with the edges 1310, 1315 of the building 1105 appearing closer together nearer the top of the image. The edge 1310 is defined between positions $(x_0, y_0)$ and $(x_2, y_2)$ and the edge 1315 is defined between positions $(x_1, y_1)$ and $(x_3, y_3)$. The angles of the edges 1310, 1315 with respect to the vertical at each of the positions are also shown. Specifically, edge 1310 has vertical angles $\varphi_{VLU}$ and $\varphi_{VLL}$ at positions $(x_0, y_0)$ and $(x_2, y_2)$, respectively, and edge 1315 has vertical angles $\varphi_{VRU}$ and $\varphi_{VRL}$ at portions $(x_1, y_1)$ and $(x_3, y_3)$, respectively. Also shown in the image is the image centre line 1320. In the image 1300B, vertical line convergence will be more extreme at the edges of the image than at the centre. This is a general characteristic of the perspective distortion which occurs due to an image sensor not being parallel to the plane of an object in the scene, as discussed previously. In an idealised scenario, this means that there will be zero vertical line convergence along the centre line 1320 of the image. Then, moving away from the centre line, the vertical line convergence will increase. This results in the non-zero angles $\varphi_{VLU}$ and $\varphi_{VLL}$ of the edge 1310 and $\varphi_{VRU}$ and $\varphi_{VRL}$ of the edge 1315. It is also noted that, since the building 1105 is not completely central to the image 1300B, the edge 1315 is slightly further from the image centre line 1320 than the edge 1310. Hence, the angles $\varphi_{VRU}$ and $\varphi_{VRL}$ of the edge 1315 will be slightly larger than the angles $\varphi_{VLU}$ and $\varphi_{VLL}$ of the edge 1310.

The fact that different portions of the image are susceptible to different levels of distortion may need to be taken into account when performing shift correction on the image. More specifically, if an edge (or line) in the image is used as a reference for performing shift correction on the image (as will be explained later), then the position of the edge with respect to the centre of the image may be important in determining whether a particular edge is suitable to be used as such a reference.

Figure 14C:
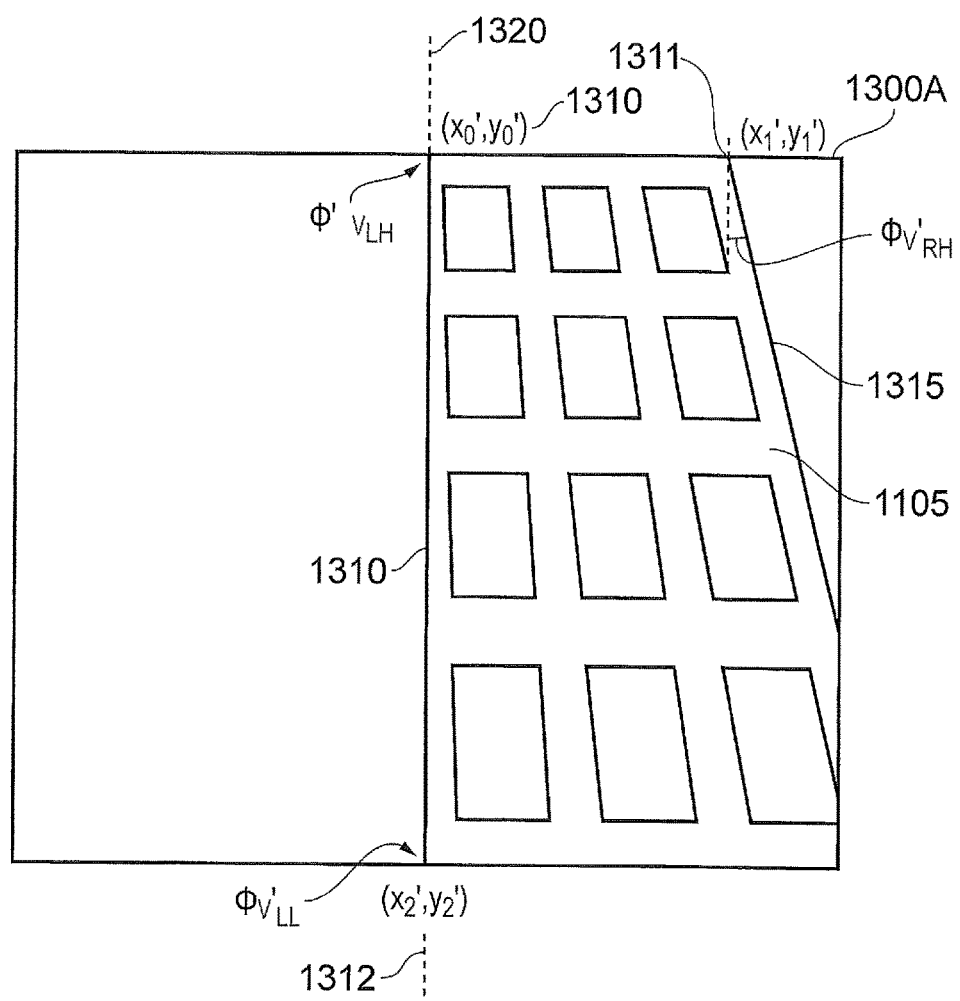

This is illustrated further with respect to FIG. 14C, which shows a larger version of image 1300A in FIG. 13. In image 1300A, an image of the building 1105 has been captured from a different perspective. The edges 1310, 1315 of the building 1105 thus appear in different positions in the image frame. Specifically, edge 1310 is now defined between positions $(x_0', y_0')$ and $(x_2', y_2')$ and edge 1315 is now defined between a position $(x_1', y_1')$ and a further position which is now outside the frame of the captured image. The vertical angles are also different. Specifically, edge 1310 now has vertical angles $\varphi_{VLU}'$ and $\varphi_{VLL}'$ and the remaining end-point of edge 1315 now has vertical angle $\varphi_{VRU}'$. Notably, edge 1310 is now aligned with the centre line 1320, and hence the vertical angles of edge 1310, $\varphi_{VLU}'$ and $\varphi_{VLL}'$, are effectively zero. On the other hand, edge 1315 is now further from the centre line compared to image 1300B, and hence the vertical angle $\varphi_{VRU}'$ is larger than the original vertical angle $\varphi_{VRU}$. As will be explained later, shift correction may be performed on an image by rotating the image in 3D space (as shown in FIG. 4) until a predetermined reference edge in the image is aligned with the true vertical. In image 1300A, edge 1310 would not be suitable as a reference for performing shift correction, since it is essentially already vertical. On the other hand, edge 1315 would be much more suitable, since it exhibits substantial vertical line convergence distortion.

As will be apparent, embodiments of the present invention help to ensure that shift correction is performed using reference edges in a suitable position of a captured image.

Another consideration for shift correction exemplified by FIGS. 14B and 14C is that objects for which line convergence distortion is a problem may vary considerably in size in different images. In FIG. 14B, for example, the perspective of the camera makes the building 1105 appear large. In other words, the building features in a large proportion of the area of the image 1300B. On the other hand, in FIG. 14C, the perspective of the camera makes the same building 1105 appear smaller. In other words, the building features in a significantly smaller proportion of the area of the image 1300A. Although it is unlikely to be a problem in this case (since in both images, the building 1105 appears as a relatively large object), it is important that reference edges for performing shift correction are chosen from objects which represent a sufficiently large area of the image, so that an image is not incorrectly shift corrected based on unimportant image features (for example, small objects which nonetheless have prominent linear features, such as above ground power-lines).

Figure 15A:
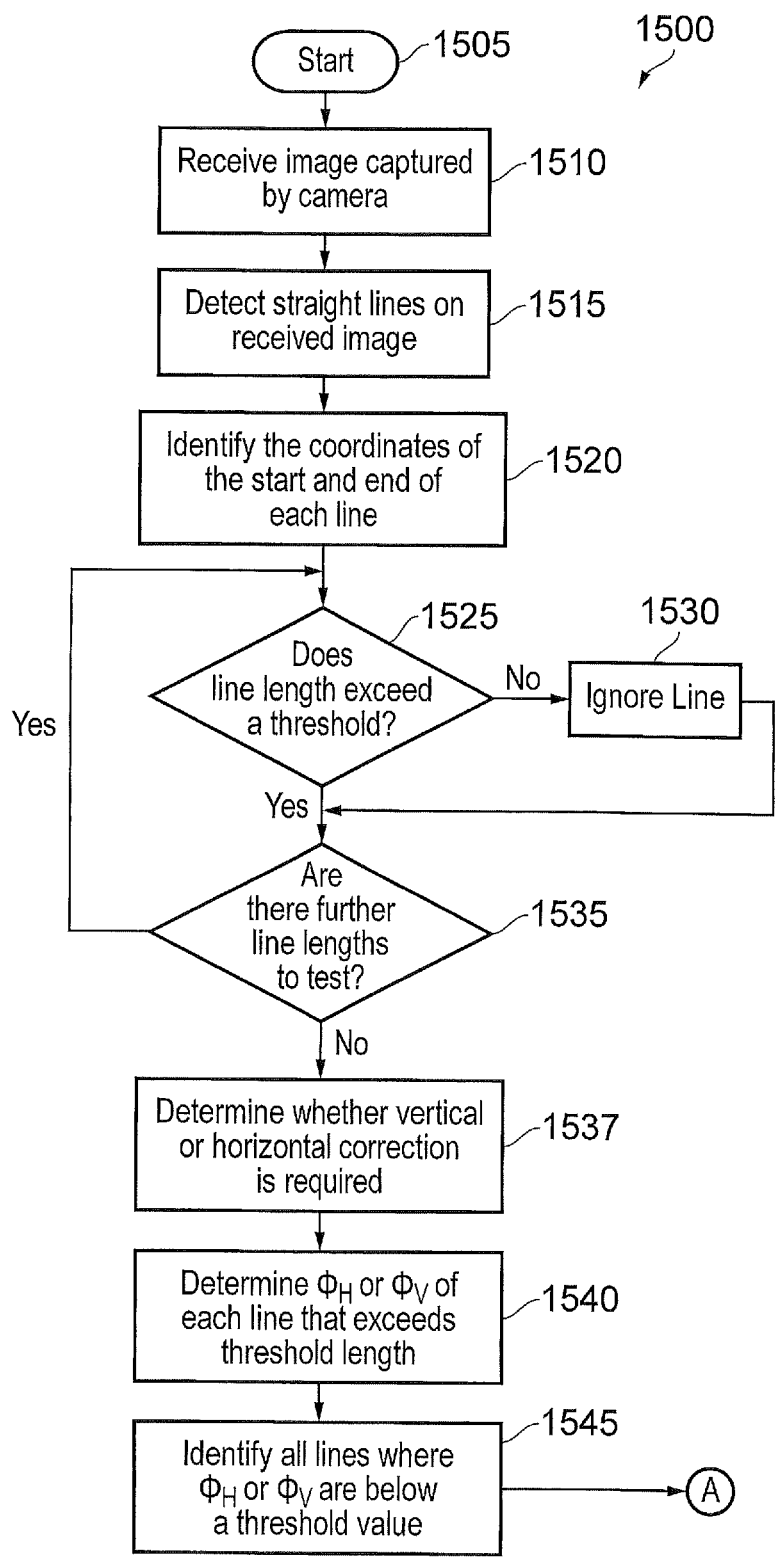
FIGS. 15A-15B describes a process for automatically detecting a subset of straight lines in a captured image and shift correcting the image based on the subset, according to an embodiment of the present invention.
Figure 15B:
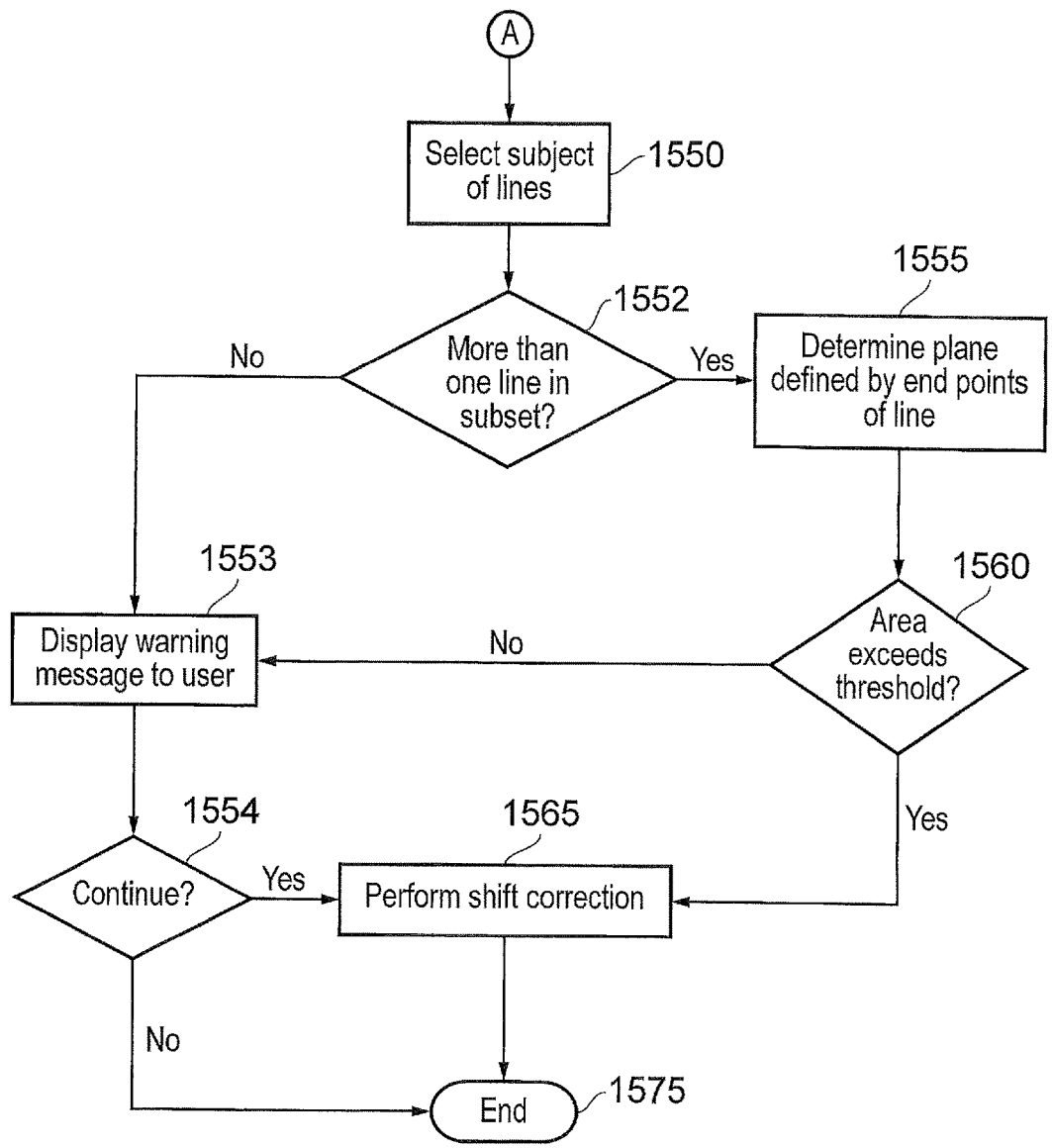

As will be apparent, embodiments of the present invention help to ensure that shift correction is only performed using reference edges from objects which feature significantly in a captured image. FIGS. 15A-15B show a flow chart 1500 explaining process of automatically determining which edges should be corrected. The process starts at step 1505. An image is captured by an image sensor in the camera. The image is provided to the processing device 1600. Therefore, the image is received by the processing device 1600 in step 1510. The received image is then analysed to detect the straight lines in the received image in step 1515. This analysis may be performed using a known technique such as Canny edge detection, Marr-Hildreth edge detection or a Hough transform. Indeed, any type of edge detection may be performed.

The pixel co-ordinate of the start and end of each line is then identified in step 1520. In any one image, a large number of lines may be detected. In order to reduce the processing burden, only lines deemed of significance in the image will be processed further. A line is deemed of significance, in embodiments, if the line exceeds a predetermined length (step 1525). This length may be a specified number of pixels in length or a certain percentage length of the screen. However, other factors may additionally or alternatively deem a line to be of significance. For example, lines further from the centre of the screen may be deemed more significant than those nearer to the edge of the screen. This is because the convergence of parallel lines tends to be more extreme at the periphery of the screen compared to the centre. Therefore, a weighting may be applied to the line depending on its proximity to the centre of the screen, so that lines which are located closer to the periphery of the screen may be deemed significant even if they are shorter.

Returning to FIG. 15A, if the line does not exceed a threshold, the line is ignored (step 1530). If the line does exceed a threshold and so the line is deemed significant, a flag is applied to the line and it is determined whether there are any more lines to test (step 1535).

If all lines detected in step 1515 have been tested, the algorithm moves to step 1537. On the other hand, if not all lines detected in step 1515 have been tested, the algorithm moves to step 1525.

In step 1537, it is determined whether it is a shift correction to correct for vertical line convergence (also known as vertical correction) or a shift correction to correct for horizontal line convergence (also known as horizontal correction) that is required. This is something which can be determined by the user prior to the start of the process 1500. The user will be aware of the type line convergence that is likely to be encountered in the scene, and can therefore set the process to handle vertical or horizontal correction as appropriate. For example, in a scene where there are a number of tall buildings, vertical line convergence is likely to be an issue, and thus the user can select that vertical correction is required. In step 1540, each line that exceeds the threshold length is analysed to determine the value of $\varphi_H$ (for the case of horizontal correction) or $\varphi_V$ (for the case of vertical correction). In order to determine $\varphi_H$ or $\varphi_V$, the pixel position in the image of both end points on the line is used.

Referring to FIG. 15B, a line 1590 is shown. The line 1590 connects a first pixel 1585 and a second pixel 1580. The first pixel 1585 is located at pixel position (x1, y1). The second pixel 1580 is located at pixel position (x2, y2). Using trigonometry, it is shown that $$\varphi_H = \tan^{-1}\frac{(|y_1 - y_2|)}{(|x_1 - x_2|)}$$

$$\varphi_V = \tan^{-1}\frac{(|x_1 - x_2|)}{(|y_1 - y_2|)}$$

Therefore, it is possible to calculate $\varphi_H$ or $\varphi_V$ for each significant line.

Returning to FIG. 15A, after the value of $\varphi_H$ or $\varphi_V$ has been calculated for each significant line, each value of $\varphi_H$ or $\varphi_V$ is compared to a threshold value and those lines having a $\varphi_H$ or $\varphi_V$ lower than a threshold are identified. This is step 1545. The purpose of the threshold value is to determine which significant line is affected by the image plane of the camera 1110 not being parallel to the building 1105 and so should be a straight horizontal or vertical line in a shift corrected image. For example, significant lines that have a $\varphi_H$ or $\varphi_V$ of less than 20° for example will be identified as lines that should be straight horizontal lines or straight vertical lines respectively. Of course, other threshold values may be selected. In step 1550, the lines having a value of $\varphi_H$ or $\varphi_V$ below the threshold value are then analysed. A subset of the lines is selected. The subset may contain one or more lines. The one or more lines within the subset may be selected in any suitable way. For example, a certain number of the longest lines (for example, the five longest lines) may be selected. Alternatively, one or more lines may be selected on the basis of their positions with respect to the centre of the image, with lines which are further from the centre (and which therefore experience more extreme line convergence) being favoured above lines closer to the centre. Of course, the one or more lines in the subset may be selected on a combination of both the positions and the lengths of the lines. In general terms, the one or more lines in the subset are chosen to be the lines which are most susceptible to line convergence and which are therefore most suitable as references for performing shift correction on the image.

In step 1552, it is then determined whether or not there is more than one line in the subset. If there is not more than one line, then the process moves to step 1553, in which the user is warned that there may be insufficient edge information in the image to perform an automatic shift correction. The process then moves to step 1554, in which input from the user is awaited as to whether or not the process should continue. If the user accepts the risk that there may be insufficient edge information, but still wants the automatic shift correction to be performed, then the process continues and moves to step 1565. On the other hand, if, based on the fact that there may be insufficient edge information, the user decides that the automatic shift correction should not be performed, then the process ends at step 1575.

Advantageously, by warning the user that the capability of the automatic shift correction may be hindered by a lack of suitable information in the image (as occurs when there is only one line to refer to in the image), the user is able to more easily monitor quality control of the processed images.

If, at step 1552, it is determined that there is more than one line in the subset, then the process moves on to step 1555. In step 1555, an area of a plane defined by the end-points of the lines in the subset is determined. The area is then compared to a threshold. For example, it could be determined as to whether or not the area defined by the end-points of the lines covers a certain proportion of the whole image (for example, 20% of the image). If it is determined that the area is less than the threshold, then the process moves to step 1553, in which the user is warned that there may be insufficient edge information in the image to perform an automatic shift correction. The process then moves to step 1554, in which the user may choose to continue with the automatic shift correction (step 1565) or to end the process (step 1575), as previously described. On the other hand, if it is determined that the area is greater than or equal to the threshold, the process moves onto step 1565.

Advantageously, by warning the user that the capability of the automatic shift correction may be hindered by a lack of suitable information in the image (as occurs when the lines in the subset only relate to a small part of the image), the user is able to more easily monitor quality control of the processed images. In step 1565, shift correction is then performed on the image on the basis of the one or more lines in the subset. This transformation can be performed using any suitable method.

In a first example, a most significant line is chosen from the subset. The most significant line could be chosen using any suitable criteria. One criteria is that the line in the subset which is furthest from the centre of the image (for example, the line which has its centre point furthest from the centre of the image), and is thus most susceptible to line convergence, is selected as the most significant line. Advantageously, this allows the shift correction of the image to be performed so as to correct for the most extreme line convergence which is likely to occur in the image.

The image is then shift corrected by transforming the image so that the most significant line becomes either a straight horizontal line (in the case of horizontal correction) or a straight vertical line (in the case of vertical correction). The image will be transformed by rotating the image in 3D space in a similar way to that shown in FIG. 4 until the most significant line becomes a straight horizontal or vertical line. That is, the image will be rotated until the horizontal $\varphi_H$ or vertical $\varphi_V$ angle of the most significant line is minimised or is made to be below a threshold. This ensures that the entire image is shift corrected relative to the most significant line.

In a second example, a plurality of lines in the subset could be used as a reference when performing the shift correction. In this case, the image is rotated in 3D space until an average value of $\varphi_H$ or $\varphi_V$ of the plurality of lines is minimised or is made to be below a threshold. Advantageously, this allows the shift correction to be optimised for more than one converging line in the image.

In both the first and second shift correction examples discussed above, the most significant line (first example) or average line (second example) value of $\varphi_H$ or $\varphi_V$ can be minimised by incrementally rotating the image in 3D space between two predetermined rotation limits. For example, the image could be rotated between ±20° in increments of a fixed incrementation angle, such as an angle of 0.2°. For each incremental rotation, the most significant line or average line value of $\varphi_H$ or $\varphi_V$ could be determined. The image would then be determined to be shift corrected for the incremental rotation for which the most significant line or average line value of $\varphi_H$ or $\varphi_V$ is minimised. The total amount of 3D rotation of the image in order for it to be deemed shift corrected is called the shift correction transformation, and may be denoted by an angle $\varphi_H$ (for horizontal correction) or $\varphi_V$ (for vertical correction). The shift correction transformation is an imaging effect parameter.

It is noted that in all shift correction methods that involve rotating the image in 3D space, it is also necessary to scale of the image to correct for distortional effects that may result from the image rotation. For horizontal correction, the image may be scaled horizontally by $\cos(\rho_H)$ to correct for horizontal distortional effects. On the other hand, for vertical correction, the image may be scaled vertically by $\cos(\rho_V)$ to correct for vertical distortional effects.

The process of automatically analysing the image and performing shift correction ends at step 1575. It is noted that if an image requires both horizontal and vertical correction, then the process 1500 may be applied twice, once for horizontal correction and once for vertical correction. In this case, an image will have both a horizontal shift correction transformation $\rho_H$ and a vertical shift correction transformation $\rho_V$. The shift correction transformation $\rho_H$ and/or $\rho_V$ which is used to correct the image is an imaging effect parameter which may be stored as metadata in association with an identifier for the frame of video. This will be explained later with reference to table 1. This allows any further post-processing to be carried out on the image should further processing be required. Also, if during post-processing it is decided not to apply the shift correction, the correction applied may be reversed using the stored value of $\rho_H$ or $\rho_V$ to revert to the original, un-corrected, image.

Figure 16:
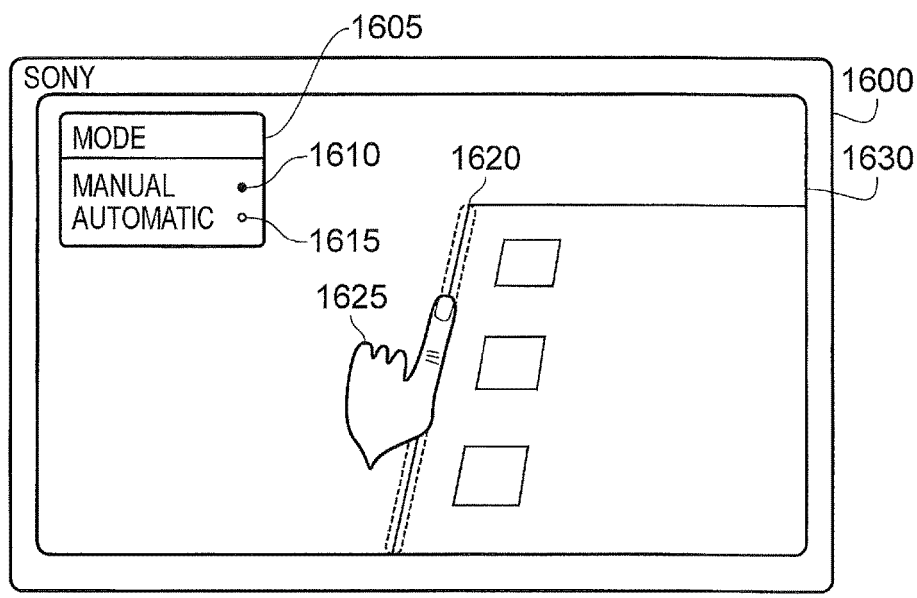
FIG. 16 describes manually selecting or deselecting a significant line for calculating shift corrections for the image.

An embodiment of the tablet 1600 is shown in FIG. 16. The tablet 1600 has a display 1630 upon which the image is displayed. It is important to note that the image displayed to the user may be a corrected image or an uncorrected image. In the case of FIG. 16, the image is uncorrected. Also displayed in a corner of the display 1630 is a mode selection box 1605. The mode selection box 1605 is located in a corner of the display 1630 to not obscure the image received at the tablet 1600. Clearly, the size and location of the mode selection box 1605 may vary depending upon the image received.

In the mode selection box 1605 a user may choose between a manual mode and an automatic mode of operation. The selection is made by the user by pressing either the manual mode radio button 1610 or the automatic mode radio button 1615.

If the automatic mode radio button 1615 is pressed, the process defined in FIGS. 15A and 15B is performed. However, if the manual mode radio button 1610 is pressed, the displayed image is not corrected. Instead, the lines within the image are detected by a known technique such as a Canny Edge Detection, Marr-Hildreth Edge detection or a Hough transform or the like. The user may then touch a line in the image. This selects that line. In FIG. 16, the user 1625 touches one edge of the building. This edge is then highlighted by area 1620. The highlighting may include a changing the colour of the line, applying an overlaid line or highlighting the start and end point of the line. If the user 1625 touches the selected line again, the user de-selects the line.

By selecting the line, the user 1625 indicates to the tablet 1600 that the selected line is both a significant line and that the line should be horizontal or vertical. The tablet 1600 transforms the image so that the chosen line becomes a straight horizontal or vertical line. The tablet 1600 calculates whether the selected line should be a horizontal straight line or a vertical straight line by determining which of $\varphi_H$ and $\varphi_V$ is lower. Specifically, if $\varphi_H$ is lower than $\varphi_V$, the image should be transformed so that the line becomes a straight horizontal line, and if $\varphi_V$ is lower than $\varphi_V$, the image should be transformed so that the line becomes a straight vertical line.

The selected line is then tracked as the camera pans. The tracking of lines and objects in a sequence of images is known and will not be discussed further. At each image in the sequence of images, the value of $\varphi_H$ and $\varphi_V$ is re-calculated to ensure that the selected straight line remains a straight horizontal line or straight vertical line. This is because the value of $\varphi_H$ and $\varphi_V$ may change as the camera pans. After calculation of $\varphi_H$ and $\varphi_V$ in each image, at each image in the sequence of images, the image is transformed so that the selected line becomes a straight horizontal or vertical line.

In the description above, the line selected by the user is used as the only reference for performing shift correction on the image. Advantageously, this allows the user to select a line which exhibits the most prominent line convergence distortion and to correct the image by transforming it until the selected line becomes sufficiently horizontal or vertical.

However, in embodiments, it may be possible for the user to select multiple lines in the image to be used as a reference for performing shift correction on the image. The image could then be shift corrected either by the tablet 1600 automatically determining the most significant line (for example, the line furthest from the centre of the image) and correcting the image with respect to this most significant line. Alternatively, the image could be shift corrected by minimising the average horizontal or vertical angle of the selected lines. Both of these methods have been discussed earlier with respect to FIGS. 15A-15B. In this case, when the manual mode radio button 1610 of the selection box 1605 is chosen, an additional selection box may appear (not shown) which allows the user to choose whether it is horizontal or vertical shift correction which is required.

Advantageously, if there is not a single prominent line which exhibits line convergence distortion, this allows the user to select a number of lines which may be suitable references and to shift correct the image based on these lines.

In embodiments, it may also be possible for the user to select one or more lines which correspond to one or more objects in the scene (for example, different buildings). The tablet 1600 may recognise these objects using any suitable object recognition algorithm (these are well known in the art and are therefore not detailed here), and the user may then select detected edges and associate each selected edge with one of the recognised objects. For example, the user could tap the screen of the tablet 1600 once to selected a detected edge (for example, an edge of a building in the image), and then tap the screen of the tablet a second time to select a recognised object in the image (for example, the building itself). This would associated the selected edge with the recognised object. Then, as the camera is panned, the image correction can be performed on the basis of the edges which have been associated with chosen the objects, as long as those objects remain in the captured images.

Advantageously, this allows the same reference edges to be used for shift correction of successively captured images, rather than different edges for different images (which may occur as the camera is panned and as successively captured images have different edges which may be detected). This results in a more consistent level of shift correction. Also, the edges of objects which are most susceptible to line convergence distortion can be chosen and associated with those objects, resulting in consistent shift correction for those objects for successively captured images.

Figure 17:
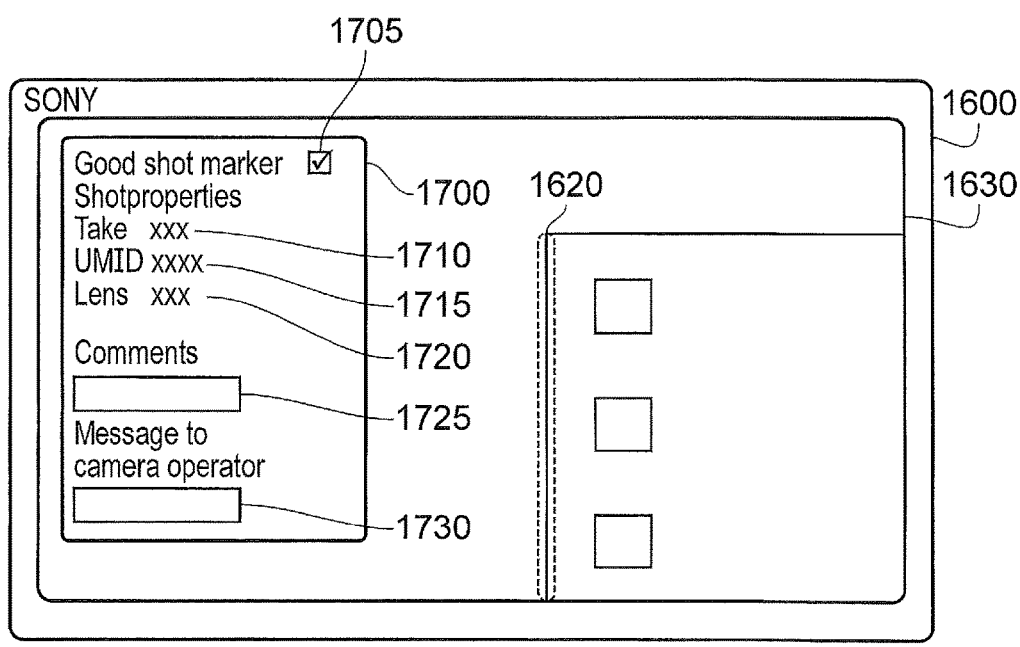
FIG. 17 describes an image which has been shift corrected according to either automatic or manual detection of a significant line.

FIG. 17 shows the tablet computer 1600 having the image shown in FIG. 16 corrected relative to the selected line 1620. The corrected image is displayed on display 1630. As can be seen, the lines within the corrected image have been transformed relative to the line selected in FIG. 16. This correction of the lines in the image relative to the selected significant line means that the perspective in the image is corrected. Of course, it will be recognised that if multiple lines were selected by the user for shift correction of the image, then the image would be corrected using these multiple lines, as already discussed.

A summary box 1700 is shown in FIG. 17. The summary box 1700 includes one or more metadata fields to be displayed to the user of the tablet 1600. Specifically, the summary box 1700 is positioned on display 1630 in the top left corner of the display. It should be noted that the summary box 1700 may be located anywhere on the display 1630. It is advantageous to place the summary box 1700 in an area of the display 1630 in which no image is being displayed. This may require the position of the summary box 1700 to move on the display 1630. So, in the example of FIG. 17, as the camera continues to pan across the building and the selected line 1620 moves to the left of the display 1630, the summary box 1700 may be re-positioned to be displayed in the top right hand corner of the display 1630. In addition or alternatively, the size of the summary box 1700 may be increased or decreased in dependence upon the use of the display 1630. So, instead of re-positioning the summary box 1700 to the top right hand corner of the display 1630, the size of the summary box 1700 may remain in the same position but instead, be made smaller. In order to reduce the size of the summary box 1700, the size of font within the summary box 1700 may be reduced. Alternatively, or additionally, the number of fields within the summary box 1700 may be reduced. For example, in FIG. 17 a shot property field is shown. However, if this field is not of crucial importance to the user of the tablet 1600, this field may be the first field to be removed in the event that the summary box 1700 needs to be made smaller. The user may therefore prioritise the content provided in the summary box 1700. This may be performed during a set-up period explained later.

Within the summary box 1700 a good shot marker box 1705 may be ticked by the user. The good shot marker box 1705 is a flag that is stored within metadata associated with the image. If the good shot marker box 1705 is selected, the currently displayed image is deemed a good shot and the good shot marker flag is activated. This assists in searching for content that the user of the tablet 1600 considers to be good as the search only returns content having the good shot flag activated. If the good shot marker is not selected by the user of the tablet 1600, the good shot flag is not activated.

Also provided within the summary box 1700 is a shot properties field. The shot properties field includes information such as the take 1710, a unique identifier 1715 that uniquely identifies the frame currently displayed and lens metadata 1720. The unique identifier may be globally unique such as a unique material identifier (UMID), or may be unique in the take or unique on the storage medium. The lens metadata 1720 may include information such as focal length (indicating the level of zoom of the image), lens aperture or the like. The lens metadata 1720 is, in embodiments, provided automatically by the lens. Additionally, a comments box 1725 is provided within the summary box 1700. The comments box 1725 is a free-text field that allows the user of the tablet 1600 to make observations against the received frame. If the user touches the comments box 1725 a virtual keyboard is activated on the tablet 1600. The virtual keyboard enables the user to enter comments on the virtual keyboard that are then stored in association with the image. The comments box 1725 may instead by a drop-down list of predefined comments such as "need hue enhancement", "contrast too high" or the like. By providing the drop-down list, it is easier and quicker for the user of the tablet to associate predefined comments to the received frame. This is particularly useful when annotating moving images.

The comment made in the comments box 1725 is stored in association with the received frame. The comment may be stored as metadata linked to the received frame using the unique identifier. A description of the metadata stored in association with the received frame is provided hereinafter in table A.

Additionally provided is a message box 1730. The message box 1730 is termed "Message to camera operator". When selected by the user, a virtual keyboard is provided on the display 1630. The user of the tablet 1600 then enters a message in the free-text message box. Similarly to the comments box 1725, instead of a free-text box, a drop down menu of predefined messages may be provided. For example, a drop-down menu of popular messages such as "pan more slowly" or the like may be provided. This again is easier and quicker for the user of the tablet to associate predefined comments to the received frame. Instead of the content of the message box 1730 being stored in association with the received frame, the content of the message box 1730 is transferred over the wireless link to the camera 1100. The content of the message box 1730 is displayed to the camera operator 1115 through the view finder. In addition to the message, the identity of the user of the tablet (entered when logging on to the tablet) is also displayed to the camera operator 1115. This enables several tablet users to each send a message to the camera operator 1110. The content of the message box 1730 may be stored in association with the unique identity or may be simply sent to the camera 1110 and not recorded. This could enable real time or near real time comments from a person reviewing or editing the captured content to be sent to a camera operator.

As noted above, the metadata associated with each frame in a sequence of frames is associated with the frame. In the example above, each frame is allocated an identifier which uniquely identifies the frame. The metadata is stored, in embodiments, in association with the frame identifier. This metadata is stored separately to the frame.

Table 1 below shows the metadata associated with a frame.

TABLE 1

| Unique ID | $\rho_H$ | $\rho_V$ | Pan | Tilt | Good Shot Marker | Focal Length (Zoom) | Comment |
|---|---|---|---|---|---|---|---|
| AC12:3ECF:23E2 | X | +1.2321° | −32.873 | +2.326 | 0 | 55.0 | Contrast too low |
| AC12:3ECF:23E3 | X | +1.2325° | −15.324 | +2.326 | 1 | 55.0 | X |
| AC12:3ECF:23E4 | X | +1.2327° | +10.654 | +2.326 | 1 | 53.2 | X |
| AC12:3ECF:23E5 | X | +1.2324° | +24.623 | +2.326 | 0 | 2.34251.7 | X |

In the column entitled "unique ID", the unique identifier that identifies the frame is provided. In the column entitled "$\rho_H$", the transform required to perform shift correction in the horizontal direction is stored. In this case, as the column contains "X", this indicates that no correction in the horizontal direction is performed. In the column entitled "$\rho_V$", the transform required to correct the tilt-shift in the vertical direction is stored. In this case, the column contains the vertical correction. The sign of the angle indicates the direction of correction. In this example, the sign "+" indicates a correction, whereas a sign "−" indicates a correction to the left. However, of course any nomenclature may be chosen. In the column entitled "pan", the value of pan of the camera 1110 when capturing the frame is stored. Similarly, in the column entitled "tilt", the value of tilt of the camera 1110 when capturing the frame is stored. The value of pan and tilt is provided by the tripod 1112.

It is emphasised that the angles $\rho_H$ and $\rho_V$ in Table 1 are the same as the "Shift Parameter" angles in the table shown in FIG. 9. Specifically, $\rho_H$ and $\rho_V$ show an angle by which the image must be rotated in 3D space in order for the image to be shift corrected.

In the column entitled "Good Shot Marker", a binary indication identifies whether the user of the tablet 1600 has determined the shot is a good shot and has indicated this using the good shot box 1705. In the case of the frame being identified as a good shot, the column shows "1" and in the event that no good shot marker is associated with the frame, the column shows "0". The column entitled "Focal Length" shows the focal length of the camera capturing the image. The focal length indicates the amount of zoom or magnification of the captured image, and is important because different focal lengths of the camera lens (which represent different zoom levels) result in different amounts of line convergence distortion. In particular, larger focal lengths/high magnification levels result in reduced line convergence distortion and thus require a reduced level of shift correction. On the other hand, lower focal lengths/lower magnification levels result in increased line convergence distortion and thus require an increased level of shift correction. In the column entitled "comments", any comments entered in or selected from the comments box 1725 are stored.

Table 1 is stored within the tablet 1600 during capturing of the scene. After the capture of the scene has been completed, the metadata of table 1 may be transferred over the wireless connection to the camera 1110 for storage therein. This transfer may take place with the metadata being transferred separately to the images or together with the images. Alternatively, table 1 may be stored within the tablet 1600 for distribution later.

Instead of storing the metadata separately to the frame, it is possible to store the metadata within the frame. For example, the metadata may be embedded within the frame.

Figure 18:
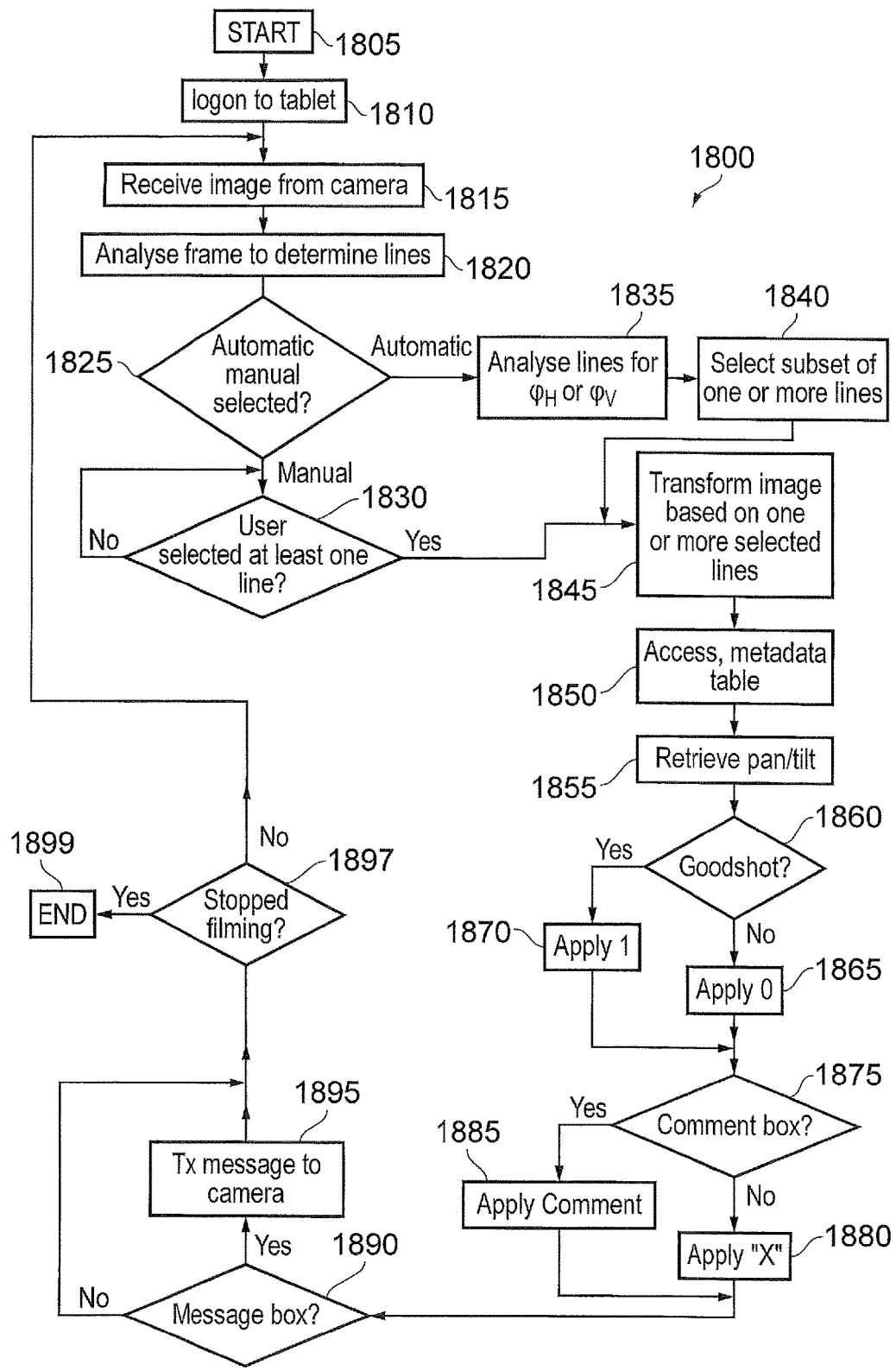
FIG. 18 describes a process for processing a captured image according to an embodiment.

FIG. 18 shows a flow chart 1800 explaining operation of the camera and the tablet.

The operation starts at step 1805. When powered on, the tablet 1600 requests the user log on to the tablet 1600. In response to the log on in step 1810, the user's profile is retrieved from the memory of the tablet. This includes the user's name and settings. Also, the rights associated with the user, such as right to amend the categories in table 1 are also retrieved during log-in. Further, as part of the log-on process, the tablet 1600 pairs with the camera 1110 using the DLNA standard.

When filming, the camera operator presses record on the camera 1110. This indicates to the tablet 1600 that a stream of images will be received from the camera. This is step 1815. A first image is received and analysed by the tablet 1600. Additionally provided with the first image is the unique identifier which uniquely identifies the first image. The analysis is carried out to determine the lines within the first image. This is step 1820 and as explained with reference to FIGS. 15A-15B, this is carried out using a Hough transform or the like. In decision step 1825, the tablet 1600 determines whether the automatic button 1615 or the manual button 1605 in the selection box 1605 is selected. If the automatic button is selected, the value of $\varphi_H$ or $\varphi_V$ is determined for each significant line (depending on whether or not horizontal or vertical correction has been selected by the user). This is step 1835. In step 1840, a subset of lines are selected and analysed, according to the method described with respect to FIG. 15A. The subset of lines includes one or more lines.

On the other hand, if the manual button 1605 is selected, the tablet 1600 waits to receive a manual selection of one or more lines in step 1830.

The image is then transformed based on the one or more selected lines. This is step 1845. In other words, the shift correction is applied to the whole image based on the one or more selected lines. As explained in step 1565 of FIG. 15B, the image is transformed so that a most suitable line is transformed to be a straight vertical or horizontal line, or so that an average of the vertical or horizontal angles of each of a plurality of selected lines is minimised.

The metadata table (table 1) is accessed in step 1850. Specifically, the metadata table is accessed such that the columns are populated with the appropriate metadata. The metadata that is stored within table 1 is determined by the user of the tablet 1600 if that user has appropriate privileges defined by the user profile stored within the tablet 1600.

Firstly, the unique identifier received with the first image is stored within table 1. The pan and tilt columns are then completed (step 1855). The pan and tilt information is generated by the tripod 1112. However, in embodiments, the pan and tilt information may be sent to the tablet 1600 via the camera 1100. Alternatively, the tripod 1112 may communicate this information directly to the tablet 1600. Furthermore, it is envisaged that the pan and tilt information may be generated by the camera 1100 itself by, for example, a calibrated accelerometer or gravimeter comprised within the camera. The pan and tilt information may then be sent to the tablet 1600 directly from the camera 1100.

In step 1860, a decision is made to determine whether the user of the tablet 1600 has selected the first image as a good shot. In other words, a decision is made to determine whether the user has checked the good shot marker box 1705. If the user of the tablet 1600 has selected the first image as being a good shot the "yes" path is followed and a "1" is applied to the good shot marker column in table 1 (step 1870). Alternatively, if the good shot marker box is not selected, the "no" path is followed and a "0" is applied to the good shot marker column in table 1 (step 1865).

Next, in step 1875, the content of the comment box 1725 is checked. If the user of the tablet 1600 has inserted a comment (either using free-text or a drop down menu), the comment is applied to the column in table 1 (step 1885). If the user of the tablet 1600 does not insert a comment, then an "X" is inserted to indicate no comment has been added (step 1880).

Finally, the tablet 1600 checks whether a message to the camera operator has been inserted in the message box 1730. If a message is inserted, the message is transmitted, along with the identity of the user of the tablet 1600 to the camera 1110. This is step 1895. Alternatively, if no message is inserted, no message is transmitted to the camera 1110. The tablet 1600 then checks whether filming has stopped. This is achieved because when the filming has stopped, a stop flag is transmitted from the camera 1110 to the tablet 1600. This check is carried out at step 1897. If filming has stopped, the "yes" path is followed to the end step 1899. Alternatively, if filming continues, the "no" path is followed and the process returns to step 1815 where the second image in the sequence of images is received.

The aforesaid description allows a director of photography or any user of the tablet 1600 to view the captured image with the correction or application of image processing at the time of filming. Therefore, if user of the tablet 1600 decides that the scene needs re-shooting, then this can be performed straightaway. In other words, the application of image processing, in embodiments, occurs at the time of image capture rather than during post production.

The aforesaid image processing takes place on every image. In other embodiments, the image processing may take place on certain marked frames. This will now be explained with reference to FIG. 19. In image A of FIG. 19, the camera 1110 is positioned at point A in FIG. 12. In other words, the camera 1110 is panned to face the left-side of the building. A tablet 1600A having the selection box 1700A and a mark selection box 1910A is shown. The mark selection box 1910A is a toggle box on the touch screen of the display that the user presses to select. The selection by the user is indicated by a check appearing in the mark selection box 1910A. By selecting the mark selection box 1910A, the image correction explained in FIG. 18 is carried out. Additionally, Table 1 is completed for the marked frame. If the mark selection box 1910A remains unchecked, however, the image processing explained with reference to FIG. 18 is not carried out. Instead an alternative image processing, explained with reference to FIG. 20 is carried out.

Figure 19:
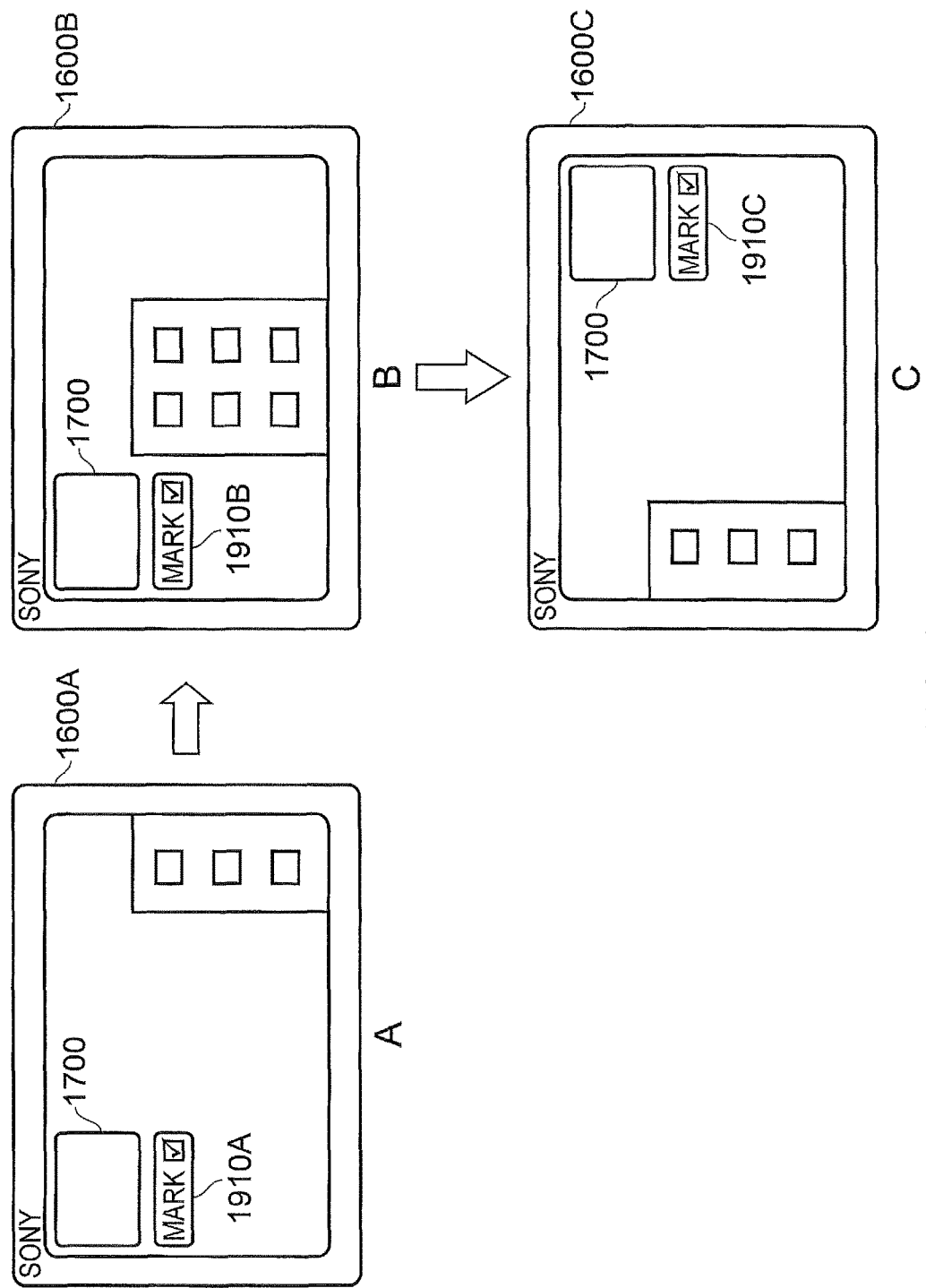
FIG. 19 describes the marking of certain images in a sequence of images which are to be shift corrected.
Figure 20:
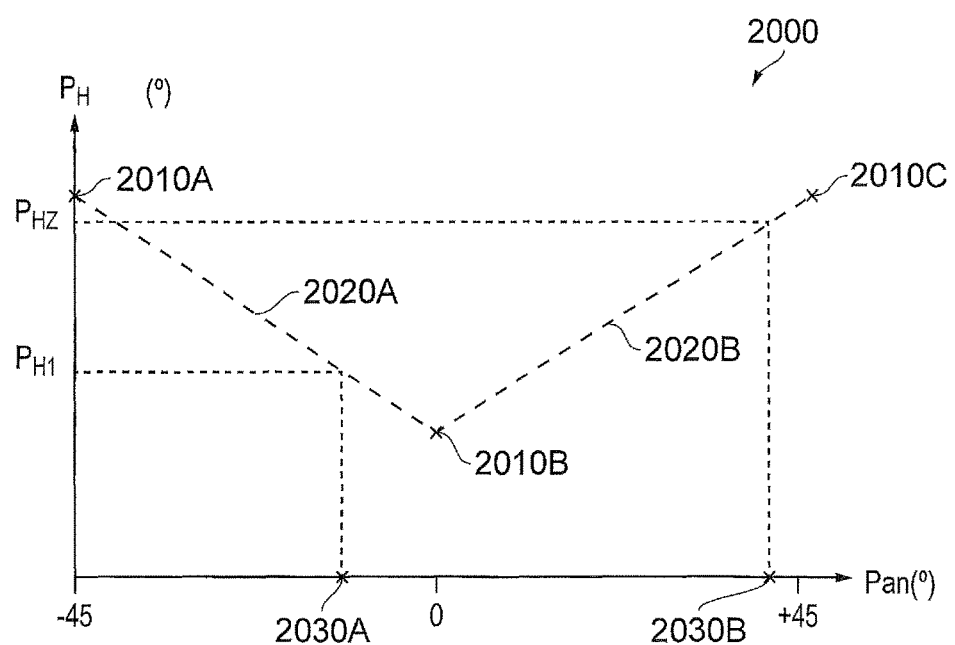
FIG. 20 describes the shift correction of the unmarked images by interpolating the shift correction of the marked images.

In image B of FIG. 19, the camera 1110 is positioned at point B in FIG. 12. In other words, the camera 1110 is panned to face the front of the building. A tablet 1600B having the selection box 1700B and the mark selection box 1910B is shown. Similar, in image C of FIG. 19, the camera is positioned at point C in FIG. 12. In other words, the camera 1110 is panned to face the right side of the building.

A tablet 1600C having the selection box 1700C and the mark selection box 1910C is shown.

As in the case of image A, because the mark selection box 1910B and mark selection box 1910C in images B and C respectively are marked, the image is corrected and the appropriate metadata is written to the table. Table 2 shows a table explaining the marked images according to the alternative image processing.

TABLE 2

| Image | $\rho_H$ | $\rho_V$ | Pan | Tilt | Good Shot Marker | Focal Length (Zoom) | Comment |
|---|---|---|---|---|---|---|---|
| A | +1.342 | X | −45.000° | +2.326 | 0 | 55.0 | Contrast too low |
| B | +0.829 | X | −0.002° | +2.326 | 1 | 53.2 | X |
| C | +1.286 | X | +40.654 | +2.326 | 1 | 51.7 | X |

In FIG. 20, a graph of $\rho_H$ against pan is shown. This graph is formed from the metadata stored in table 2. Specifically, the graph 2000 shows the value of $\rho_H$ for image A (point 2010A), image B (point 2010B) and image C (point 2010C). The relationship between point 2010A and point 2010B is linear (line 2020A) and the relationship between point 2010B and point 2010C is linear (line 2020B). Of course, although a linear relationship between the points is shown, in embodiments, other relationships between the points are envisaged such as exponential, polynomial or squared type relationships.

In order to determine the value of $\rho_{H1}$ for the image captured when the camera 1110 is at a pan position of −10.232° (2030A), the value of $\rho_{H1}$ is obtained from line 2020A. Further, in order to determine the value of $\rho_{H2}$ for the image captured when the camera 1110 is at a pan position of 39.231° (2030B), the value of $\rho_{H2}$ is obtained from line 2020B.

In use, therefore, the camera 1110 may move across a scene during a rehearsal. During the rehearsal, the director of photography (who, in one example, is the user of the tablet 1600) marks several positions during the rehearsal. The metadata associated with the position of the camera (the pan and/or tilt) of the camera 1110 is captured from the camera or the tripod 1112. The value of $\rho_H$ and/or $\rho_V$ is calculated by the tablet 1600 and stored in association with the position of the camera 1110 when the image is marked. During live capture, the camera 1110 follows the same path and the tablet 1600 then interpolates the value of $\rho_H$ and/or $\rho_V$ for any value of pan and/or tilt from the marked positions. Therefore, the tablet 1600 will only need to calculate the value of $\rho_H$ and/or $\rho_V$ for marked images once during rehearsal and for all other images in the sequence captured during live capture, the tablet 1600 will interpolate the value of $\rho_H$ and/or $\rho_V$. This efficiently uses processing power within the tablet 1600 compared with calculating the value of $\rho_H$ and/or $\rho_V$ for each image.

The interpolation technique discussed with reference to FIG. 20 occurs on the assumption that the focal length of the lens changes between positions A, B and C during live capture in the same way as it changed during the rehearsal (that is, from 55.0 mm in position A to 53.2 mm in position B, and from 53.2 mm in position B to 51.7 mm in position C). This is important since, as already discussed, different focal lengths of the camera lens (representing different zoom levels) result in different amounts of line convergence distortion and thus require different shift correction transformations $\rho_H$ and/or $\rho_V$. The interpolated shift correction transformation may not be correct if different focal lengths to those used in the rehearsal camera pan are used.

In embodiments, if, during live capture, the camera reaches one of the predetermined positions A, B or C with a different focal length to that recorded in the metadata in table 2 during rehearsal for that position (allowing for an appropriate margin of error, such as 5%), then a warning is issued to the user. In addition, the focal length error (that is, the difference between the focal length for the position recorded during rehearsal and the focal length for the position recorded during live capture, when the difference exceeds the acceptable error margin) may be recorded as additional metadata. The focal length error may then be used for correction of the interpolated shift corrected images obtained during live capture, either in real time via the tablet 1600, or later during post-processing.

Figure 21:
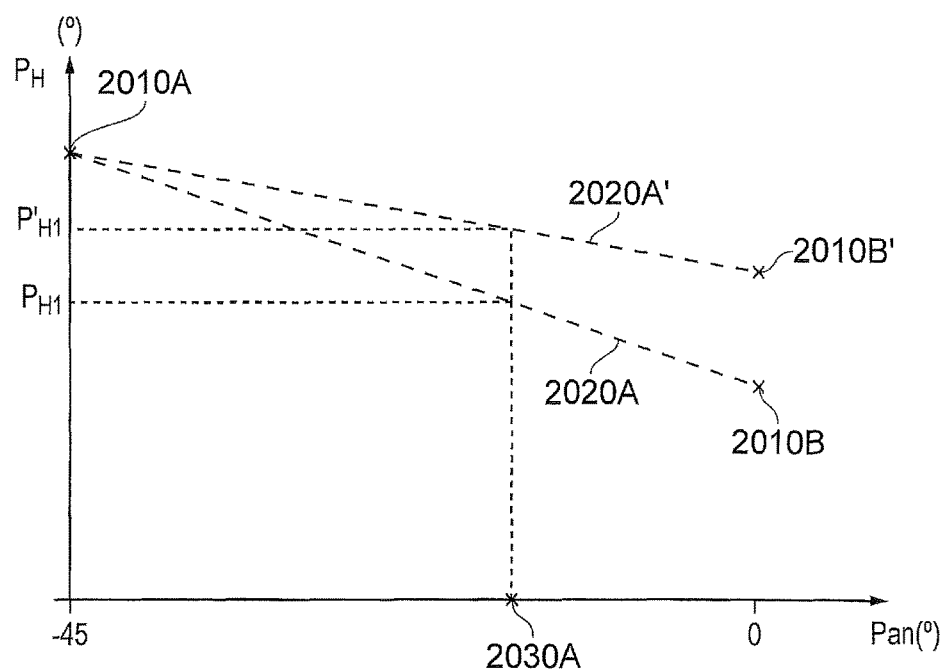
FIG. 21 describes correcting the interpolated shift correction of the marked images to take into account changes in the zoom level of the camera.

In embodiments, the correction of the interpolated shift corrected images using the focal length error may take place using the method illustrated in FIG. 21. FIG. 21 shows an enlarged portion of the graph of FIG. 20 with some extra data. Specifically, FIG. 21 shows a graph of the interpolated shift correction transformation $\rho_H$ against the camera pan as the camera moves from position A to position B.

A first dashed line 2020A is the same line as that found in FIG. 20, and indicates the interpolated shift correction when the zoom of the camera lens in positions A and B is the same as that used during the rehearsal. Here, the interpolated shift correction transformation at camera pan position 2030A is $\rho_{H1}$. However, FIG. 21 also shows a second dashed line 2020A' which is not shown in FIG. 20. Line 2020A' indicates the interpolated shift correction when the zoom of the camera lens in position B is different to that used during the rehearsal. In this case, a lower focal length at position B compared to that used during the rehearsal has been used, resulting in a lower magnification and more prominent line convergence distortion. From the focal length error (that is, the difference between the rehearsal focal length at position B and the different, lower focal length used in live capture at position B, which will be negative in this case), the tablet 1600 recognises that a larger shift correction transformation $\rho_H$ will be required. The larger shift correction transformation $\rho_H$ results in the point 2010B'. The tablet may calculate the larger shift correction transformation $\rho_H$ from the focal length error (which represents a relative change in magnification) using a lookup table associated with lens being used with the camera 1110. The lookup table may be sent from the camera 1110 to the tablet 1600 as additional metadata. The interpolated shift correction transformation $\rho_H$ may thus be calculated using the new dashed line 2020A' which extends from 2010A to 2010B'. So, the interpolated shift correction transformation at camera pan position 2030A becomes $\rho_{H1}'$ instead of $\rho_{H1}$.

Advantageously, the interpolated shift correction transformation for each image captured as the camera moves from position A to position B is thus corrected to take into account changes in the focal length of the camera lens with respect to the rehearsal. This maintains the efficient processing of only calculating the shift correction for marked images (instead of all images), but also gives more flexibility to the camera operator to change the focal length/zoom level during live capture.

In the embodiments of FIGS. 19-21, it is noted that, rather than using an edge detection technique, the shift correction transformation $\rho_H$ and/or $\rho_V$ for each of the marked images captured at the positions A, B and C could be entered manually by the user. For example, for each marked image, the user could enter a numerical value of $\rho_H$ and/or $\rho_V$ using a numerical keypad displayed on the tablet (not shown) or could gradually increase or decrease the value of $\rho_H$ and/or $\rho_V$ using increase and decrease buttons displayed on the tablet (not shown) until the line convergence distortion is observed to be satisfactorily removed. These manually entered values of $\rho_H$ and/or $\rho_V$ could then be saved as the metadata in table 2 and used for the interpolation techniques discussed above.

Figure 22:
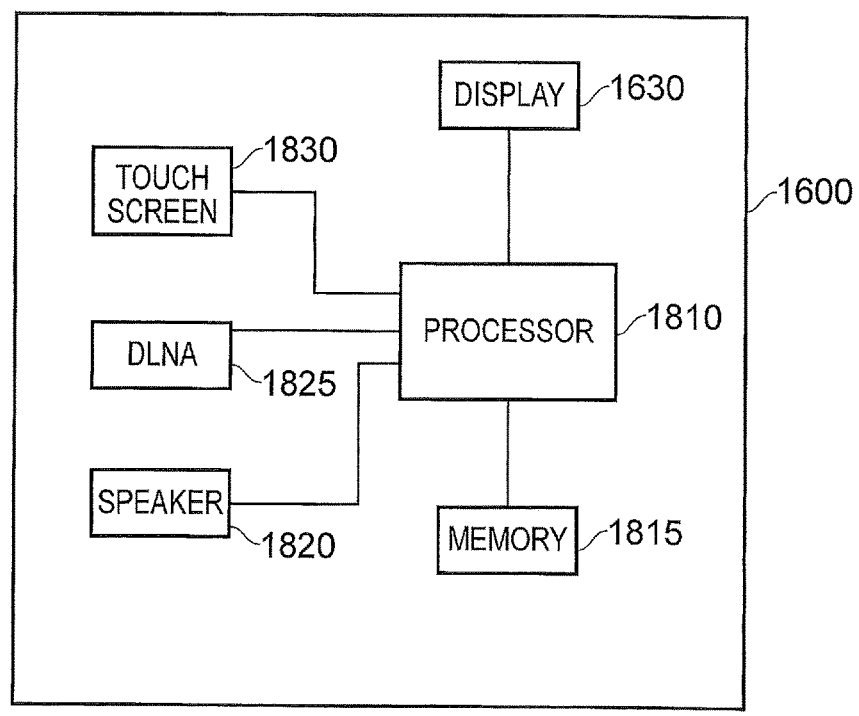
FIG. 22 describes a tablet computer which may be used for processing captured images according to an embodiment.

FIG. 22 shows a block diagram of the tablet 1600. The tablet 1600 is controlled by a processor 1810. The processor 1810 is controlled by computer readable instructions, which when run by the processor 1810, makes the tablet 1600 perform certain steps. Memory 1815 is connected to the processor 1810. The memory 1815 stores a computer program which contains the computer readable instructions which, when loaded onto the processor 1810 controls the processor 1810. The memory 1815 may be any kind of memory such as solid state memory, optical readable memory, magnetic readable memory or the like. Additionally stored within the memory 1815 is the metadata in table 1 and/or table 2. The metadata may be output from the memory separately to the image stored within the memory 1815. The display 1630 is also connected to the processor 1810 and is controlled thereby. Overlaid on the display 1630 is a transparent touch screen 1830. By pressing the touch screen 1830, the user interacts with the tablet 1600. A DLNA processor 1825 is connected to the processor 1810. The DLNA processor 1825 communicates with the camera 1110 to form a wireless link therewith. Finally, the tablet 1600 includes a speaker 1820 for outputting sound. The speaker 1820 is connected to the processor 1810.

Figure 23:
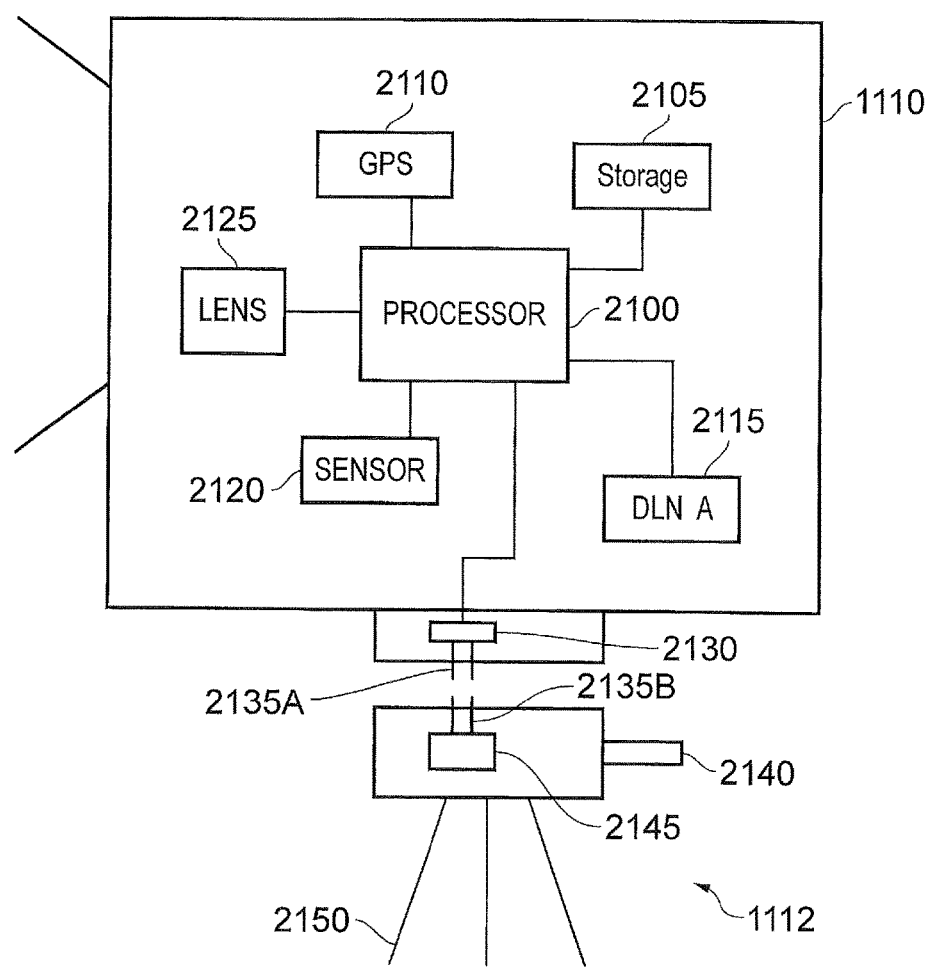
FIG. 23 describes a camera and tripod arrangement which may be used for capturing images according to embodiments.

FIG. 23 shows a block diagram of the camera 1110 and the tripod 1112. The camera 1110 comprises a camera processor 2100 which controls the operation of the camera 1110. Connected to the camera processor 2100 is a lens 2125, a Global Positioning System block 2110, camera storage 2105, a DLNA block 2115, a sensor 2120 and a mounting connector 2130. The lens 2125 focuses the light onto an image sensor (not shown). The lens 2125 also provides the lens metadata stored in table 1 and 2 which includes the focal length of the lens and other metadata associated with the lens like the model of the lens and the like. The global positioning block 2110 determines the geographical position of the camera 1110. The sensor 2120 in the camera 1110 determines the angle of tilt and/or pan of the camera. However, as will be appreciated, this may not be required if the angle of tilt and/or pan of the camera 1110 is determined by the tripod 1112, as is the case in this embodiment.

The DLNA block 2115 pairs the camera 1110 to the tablet 1600 using the DLNA standard so that data such as metadata and image data may be passed between the camera 1110 and the tablet 1600.

The camera storage 2105 stores images captured by the camera 1110 and metadata associated with the lens 2125. Further, the camera storage 2105 contains computer readable instructions which, when loaded onto the camera processor 2100, configures the camera processor 2100 to perform certain methods consistent with embodiments of the disclosure.

The mounting connector 2130 contains a first part 2135A which, when mounted onto the tripod 1112 engages with a second part 2135B. The second part 2135B is coupled to a tilt and/or pan sensor 2145 that determines the tilt and/or pan of the camera 1110 with reference to the tilt and/or pan of the tripod 1112. The tilt and/or pan sensor 2145 communicates with the camera 1110 via the engaged first part 2135A and the second part 2135B of the mounting connector 2130. The tilt and/or pan of the tripod is controlled by the grip 2140 and the height of the tripod is adjusted by adjusting one or more legs 2150 of the tripod 1112.

It should be noted that although the foregoing relates to images, these images may be full resolution images such as so-called High Definition images, or even Super High Definition images such as 4K or even 8K images. Alternatively, these images may be lower resolution representations of the images captured by the camera. For example, the images used in the above embodiment may be preview images similar or the same as those preview images described in earlier embodiments.

Further, in embodiments, the tablet 1600 may not perform the transformation thereon. For example, the value of $\varphi_H$ and $\varphi_V$ may be calculated on the tablet 1600 and these values may be transferred to a separate device for performing the image processing on the image. This separate device may include computers located on the cloud for example as in the case of earlier embodiments. Alternatively, the device may be a stand-alone computer with specialised graphics processors. In other words, the calculation of the transformations may be calculated on the tablet 1600, but the intensive image processing may be carried out on a specialist device that is located separately to the tablet 1600.

It will be appreciated that features of embodiments of this disclosure could be combined as appropriate so as to benefit from the advantageous features the disclosure.

For example, the image processing device 500 could be comprised within the tablet 1600. This would allow shift correction to be applied to smaller-sized, preview images by the tablet using the line detection method described with reference to FIGS. 15-16.

Specifically, an image from the camera 1100 could be transmitted to the tablet 1600 and received by the receiver 505 of the image processing device 500 comprised within the tablet 1600. The image could then be converted to a smaller-sized, preview image by the converter 510, processed to apply the shift correction as an imaging effect by the image pre-processor 520 and output by the display output 525 to the display 1630 of the tablet 1600.

Figure 15C:
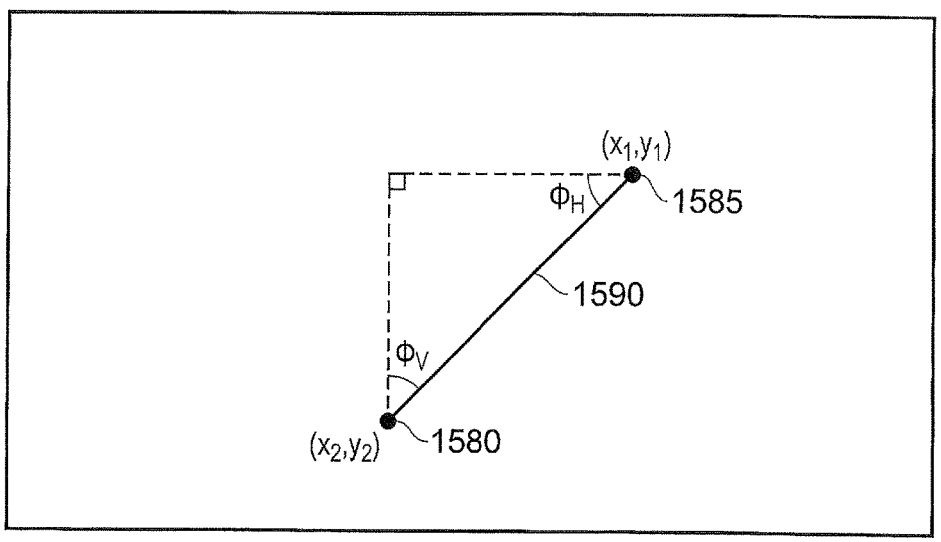
FIG. 15C describes the calculation of the angles of a detected line in an image with respect to the vertical and horizontal.

In this case, the shift correction applied by the image pre-processor 520 would be achieved using the line detection method described with reference to FIGS. 15-16. Specifically, the values of $\varphi_H$ and $\varphi_V$ for the most significant line (the most significant line being detected manually or automatically) would be calculated by the shift correction controller 530 by analysing the pre-view image generated by the converter 510. The value of $\varphi_H$ (in the case of a horizontal line) or $\varphi_V$ (in the case of a vertical line) would then be output as an imaging effect parameter to the image pre-processor 520 in order for the image pre-processor to perform the shift correction. The image pre-processor 520 would then perform the shift correction by rotating the image in 3D space until the value of $\varphi_H$ or $\varphi_V$ became zero (or as close to zero as possible).

The value of $\varphi_H$ or $\varphi_V$ would also be output to the image/parameter output 515 for storage and/or transmission. For example, the value of $\varphi_H$ or $\varphi_V$ could be stored together with the values of $\varphi_H$ or $\varphi_V$ for other captured images of the scene in a table such as table 1 (along with the other parameters, such as the pan and tilt information, received from the camera 1100). Once filming is complete, the table could then be transmitted back to the camera 1100 or another suitable device to be used in conjunction with the image processing apparatus 700 for performing the previewed shift correction on the original, full-size, non-converted images captured by the camera 1100, as previously described.

Advantageously, by using the image processing apparatus 500 in the tablet 1600, the tablet 1600 does not have to perform the shift correction on the full-size original images captured by the camera 1600. Rather, the shift correction is performed on smaller-sized, preview images, thus reducing the amount of processing required. Reduced requirements for processing are particularly desirable for battery-powered devices such as the tablet 1600, since it may increase the life of the battery.

It is noted that in the case where the image processing device 500 is comprised within the tablet 1600, it may not be necessary for the image/parameter output 515 to transmit the full-size, original images along with the image effect parameters, $\varphi_H$ or $\varphi_V$, for each image. This is because the full-size, original images may already be stored in a storage device associated with the camera 1100. In this case, it is only the image effect parameters which must be transmitted, so that they may be stored with the full-size, original images and processed with the full-size, original images at a later stage using the imaging processing device 700.

It is also noted that the above-described combination of the tablet 1600 and image processing device 500 could be used with the interpolating shift correction embodiment described with reference to FIGS. 19-20. In this case, images may be constantly received by the receiver 505 and displayed on the display 1630. However, shift correction and parameter output are only performed on an image when the image is selected as a marked image using the mark selection box 1910A-C. In this case, the shift correction controller 530 responds to the action of the user selecting the image as marked by generating an image effect parameter $\varphi_H$ or $\varphi_V$ and instructing the image pre-processor 520 to perform the shift correction. In this case, the image effect parameter $\varphi_H$ or $\varphi_V$ is also output by the image/parameter output 515 for storage and/or transmission. For example, the image effect parameter $\varphi_H$ or $\varphi_V$ may be stored and/or transmitted as part of table such as table 2.

It is also envisaged that the components of the image processing device 500 could be shared between two devices. Specifically, the receiver 505 and converter 510 of the image processing device 500 could be comprised within the camera 1100, and the remaining components could be comprised within the tablet 1600. A captured image could then be converted to a smaller-sized preview image before being transmitted to the tablet 1600. Advantageously, this would allow the preview image to be shift corrected and displayed and the imaging effect parameter $\varphi_H$ or $\varphi_V$ to be stored and/or transmitted whilst, at the same, time reducing the bandwidth required in transmitted image data between the camera 1100 and tablet 1600. It would also further reduce the processing required by the tablet 1600, since the tablet 1600 would no longer have to perform the image conversion. The battery life of the tablet 1600 would thus be further improved.

Obviously, numerous modifications and variations of the present disclosure are possible in light of the above teachings. It is therefore to be understood that within the scope of the appended claims, the invention may be practiced otherwise than as specifically described herein.

In so far as embodiments of the invention have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

Clauses

Features and/or embodiments of the aforesaid disclosure may be generally expressed in the following clauses.

1. An image processing device, comprising:
image receiver circuitry configured to receive a first image;
image converter circuitry configured to convert the first image to a second image, the second image being a smaller-sized representation of the first image;
image processor circuitry configured to perform an imaging effect on the second image to form a third image, the imaging effect being defined by an imaging effect parameter;
first output device circuitry configured to output the third image for display; and second output device circuitry configured to output the first image and the imaging effect parameter.

2. The image processing device according to clause 1, wherein the second image is a lower resolution version of the first image.

3. The image processing device according to any preceding clause, wherein the second output device circuitry is configured to output the first image and imaging effect parameter to a storage medium.

4. The image processing device according to any preceding clause, wherein the second output device circuitry is configured to transmit the first image and the imaging effect parameter to a remote device.

5. The image processing device according to clause 4, wherein the first image and imaging effect parameter are transmitted over a computer network.

6. The image processing device according to any preceding clause, wherein:
the imaging effect is a shift correction effect and the imaging effect parameter is a shift correction parameter; and
the image processing device comprises shift correction controller circuitry configured to generate the shift correction parameter.

7. The image processing device according to clause 6, wherein the shift correction parameter is a rotation angle by which the second image is digitally rotated in three-dimensional space.

8. The image processing device according to clause 7, wherein the shift correction controller circuitry is configured to receive an input from a user to select a value of the angle of the shift correction parameter to be generated.

9. The image processing device according to clause 7, wherein
the first image is captured by a camera; and
the value of the angle of the shift correction parameter is selected by the shift correction controller using data from one of an accelerometer or gravimeter associated with the camera.

10. The image processing device according to any preceding clause, wherein:
the image receiver circuitry is configured to receive a plurality of first images at a predetermined frame rate; and
a time between the image receiver receiving each first image and the first output device outputting a respective third image for display is less than or equal to the time period between successive first images.

11. An image processing device comprising
receiver circuitry configured to receive an image and an imaging effect parameter, the imaging effect parameter defining an imaging effect to be performed on the image;
image processor circuitry configured to perform the imaging effect on the image, using the imaging effect parameter, to produce a final image; and
final image output device circuitry configured to output the final image.

12. The image processing device according to clause 11, wherein the receiver circuitry is configured to receive the image and imaging effect parameter from a remote device.

13. The image processing device according to clause 12, wherein the image and imaging effect parameter are received over a computer network.

14. A system comprising:
a first image processing device comprising:
    image receiver circuitry configured to receive a first image;
    image converter circuitry configured to convert the first image to a second image, the second image being a smaller-sized representation of the first image;
    image processor circuitry configured to perform an imaging effect on the second image to form a third image, the imaging effect being defined by an imaging effect parameter;
    first output device circuitry configured to output the third image for display; and
    second output device circuitry configured to output the first image and the imaging effect parameter; and
a second image processing device comprising:
    receiver circuitry configured to receive the first image and the imaging effect parameter;
    image processor circuitry configured to perform the imaging effect on the first image, using the imaging effect parameter, to produce a final image; and
    final image output device circuitry configured to output the final image.

15. The system according to clause 14, wherein the first and second image processing devices are remote from one another, and the second output device of the first image processing device circuitry is configured to transmit the first image and imaging effect parameter to the receiver of the second imaging processing device.

16. The system according to clause 15, wherein the first image and imaging effect parameter are transmitted over a computer network.

17. An image processing method, comprising:
receiving a first image;
converting the first image to a second image, the second image being a smaller-sized representation of the first image;
performing an imaging effect on the second image to form a third image, the imaging effect being defined by an imaging effect parameter;
outputting the third image for display; and outputting the first image and the imaging effect parameter.

18. An image processing method, comprising:
receiving an image and an imaging effect parameter, the imaging effect parameter defining an imaging effect to be performed on the image;
performing the imaging effect on the image, using the imaging effect parameter, to produce a final image; and
outputting the final image.

19. An image processing method comprising:
a first step of:
    receiving a first image;
    converting the first image to a second image, the second image being a smaller-sized representation of the first image;
    performing an imaging effect on the second image to form a third image, the imaging effect being defined by an imaging effect parameter;

outputting the third image for display; and
outputting the first image and the imaging effect parameter; and
a second step of:
receiving the first image and the imaging effect parameter;
performing the imaging effect on the first image, using the imaging effect parameter, to produce a final image; and
outputting the final image.

20. A non-transitory computer readable medium including computer program instructions, which when executed by a computer causes the computer to perform the method of clause 17.

21. An image processing device, method or system as hereinbefore described with reference to the accompanying drawings.

22. A device for performing shift correction on a sequence of captured images, comprising:
image receiver circuitry configured to receive a first image in the sequence, the first image being an image of a scene captured using an image sensor in a first position, and a second image in the sequence, the second image being an image of the scene captured using the image sensor in a second, different, position; and
image transformer circuitry configured to perform a shift correction transformation on each of the first and second images; wherein
the shift correction transformation on the first image is defined by a first shift correction parameter; and
the shift correction transformation on the second image is defined by a second shift correction parameter.

23. The device according to clause 22, wherein:
the image receiver circuitry is configured to receive a third image of the scene captured using the image sensor as the image sensor is moved from the first position to the second position; and
the image transformer circuitry is operable to perform a shift correction transformation on the third image; wherein
the shift correction transformation on the third image is defined by a third shift correction parameter, the third shift correction parameter being based on an interpolation of the first and second shift correction parameters.

24. The device according to clause 23, wherein:
the first and second images of the scene are captured during a first movement of the image sensor from the first position to the second position; and
the third image is captured during a second movement of the image sensor from the first position to the second position, the second movement occurring subsequent to the first movement.

25. The device according to clause 24, wherein:
the first, second and third images are captured by the image sensor in combination with a lens with a changeable focal length;
the image transformer circuitry is configured to receive the focal length used for the first and second image sensor positions as metadata from the lens; and
the image transformer circuitry is configured to correct the first shift correction parameter for a difference between the focal length used at the first image sensor position during the first image sensor movement and the focal length used at the first image sensor position during the second image sensor movement, and to correct the second shift correction parameter for a difference between the focal length used at the second image sensor position during the first image sensor movement and the focal length used at the second image sensor position during the second image sensor movement, the first and second shift correction parameters being corrected prior to the generation of the third shift correction parameter by interpolation.

26. The device according to any of clauses 22-25, wherein the first shift correction parameter is an angle indicating the amount of the shift correction transformation to be applied to the first image and the second shift correction parameter is an angle indicating the amount of the shift correction transformation to be applied to the second image.

27. The device according to clause 26, comprising user interface circuitry configured to receive the angles of the first and second shift correction parameters from a user.

28. The device according to any one of clauses 26, comprising:
edge detector circuitry operable to perform edge detection on at least a portion of each of the first and second images to determine one or more straight lines in each image;
line subset selector circuitry configured to select a subset of one or more straight lines from the one or more determined straight lines for each image;
shift correction orientation circuitry configured receive an input from the user to determine whether it is a vertical or a horizontal shift correction transformation which is required; and
angle calculator circuitry configured to calculate an angle of each of the straight lines in the subset for each image with respect to the horizontal when it is a horizontal shift correction transformation which is required or the vertical when it is a vertical shift correction transformation which is required.

29. The device according to clause 28, further comprising:
significant line selection circuitry configured to select a most significant line from the subset of one or more straight lines based on one of the length of each line and the proximity of each line to the centre of the image for each image; wherein
the image transformation circuitry performs the shift correction transformation on the first image until the horizontal or vertical angle of the most significant line of the first image is minimised or is made to be below a first threshold; and
the image transformation circuitry performs the shift correction transformation on the second image until the horizontal or vertical angle of the most significant line of the second image is minimised or is made to be below a second threshold.

30. The device according to clause 28, wherein:
the image transformation circuitry performs the shift correction transformation on the first image until an average value of the horizontal or vertical angles of the straight lines in the subset of the first image is minimised or is made to be below a first threshold; and
the image transformation circuitry performs the shift correction transformation on the second image until an average value of the horizontal or vertical angles of the straight lines in the subset of the second image is minimised or is made to be below a second threshold.

31. The device according to any one of clauses 28-30, wherein:
the line subset selector circuitry is configured to be responsive to an input from a user in order to select the subset of straight lines in each of the first and second images.

32. The device according to clause 28-30, wherein:
the line subset selector circuitry is configured to:
determine a first set of straight lines for each image, wherein each straight line in the first set exceeds a predetermined threshold length;

determine a second set of straight lines from the first set for each image, wherein each straight line in the second set has a horizontal or vertical angle below a predetermined threshold angle; and determine the subset of straight lines for each image from the second set based on one of the length of each line and the proximity of each line to the centre of the image.

33. The device according to any one of clause 22 to 32 further comprising the image sensor which, in use, captures the first and second images.

34. The device according to any one of clause 22 to 33, wherein the shift correction transformation is performed on a low resolution version of the first and second images, and the device further comprises output circuitry operable to transfer the first and second shift correction parameter over a network.

35. A system comprising the device according to clause 34 connected, in use, over a network to a server, wherein the server comprises a receiver circuitry configured to receive the first and second shift correction parameter and the full resolution version of the first and second image and an image processor circuitry configured to perform shift transformation correction on the received full resolution version of the first and second image using the received first and second shift correction parameter.

36. A method of performing shift correction on a sequence of captured images, comprising:

receiving a first image in the sequence, the first image being an image of a scene captured using an image sensor in a first position, and a second image in the sequence, the second image being an image of the scene captured using the image sensor in a second, different, position; and performing a shift correction transformation on each of the first and second images; wherein the shift correction transformation on the first image is defined by a first shift correction parameter; and the shift correction transformation on the second image is defined by a second shift correction parameter.

37. A non-transitory computer readable medium including computer program instructions, which when executed by a computer causes the computer to perform the method of clause 36.

The invention claimed is:

1. An image processing device, comprising:

image receiver circuitry configured to receive a first image;

image converter circuitry configured to convert the first image to a second image, the second image being a smaller-sized representation of the first image;

image processor circuitry configured to perform an imaging effect on the second image to form a third image, the imaging effect being defined by an imaging effect parameter;

first output device circuitry configured to output the third image for display before the first image is captured for storage; and second output device circuitry configured to output the first image and the imaging effect parameter after the third image is output for display, wherein a time between the image receiver receiving the first image and the first output device outputting a respective third image for display is less than or equal to a frame rate at which the image receiver receives a plurality of first images.

2. The image processing device according to claim 1, wherein the second image is a lower resolution version of the first image.

3. The image processing device according to claim 1, wherein the second output device circuitry is configured to output the first image and imaging effect parameter to a storage medium.

4. The image processing device according to claim 1, wherein the second output device circuitry is configured to transmit the first image and the imaging effect parameter to a remote device.

5. The image processing device according to claim 4, wherein the first image and imaging effect parameter are transmitted over a computer network.

6. The image processing device according to claim 1, wherein:

the imaging effect is a shift correction effect and the imaging effect parameter is a shift correction parameter; and the image processing device comprises shift correction controller circuitry configured to generate the shift correction parameter.

7. The image processing device according to claim 6, wherein the shift correction parameter is a rotation angle by which the second image is digitally rotated in three-dimensional space.

8. The image processing device according to claim 7, wherein the shift correction controller circuitry is configured to receive an input from a user to select a value of the angle of the shift correction parameter to be generated.

9. The image processing device according to claim 7, wherein the first image is captured by a camera; and the value of the angle of the shift correction parameter is selected by the shift correction controller using data from one of an accelerometer or gravimeter associated with the camera.

10. An image processing method, comprising:

receiving a first image;

converting the first image to a second image, the second image being a smaller-sized representation of the first image;

performing an imaging effect on the second image to form a third image, the imaging effect being defined by an imaging effect parameter;

outputting the third image for display; and outputting the first image and the imaging effect parameter, wherein a plurality of first images are received at a first frame rate, and a time between receiving each first image and outputting a respective third image for display is less than or equal to the time period between successive first images.

11. A non-transitory computer readable medium including computer program instructions, which when executed by a computer causes the computer to perform the method of claim 10.

12. An image processing device comprising:

circuitry configured to receive a first image;

convert the first image to a second image, the second image being a smaller-sized representation of the first image;

perform an imaging effect on the second image to form a third image, the imaging effect being defined by an imaging effect parameter;

output the third image for display; and output the first image and the imaging effect parameter, wherein a plurality of first images are received at a first frame rate, and a time between receiving each first image and outputting a respective third image for display is less than or equal to the time period between successive first images.

13. The image processing device according to claim 12, wherein the second image is a lower resolution version of the first image.

14. The image processing device according to claim 12, wherein the first image and the imaging effect parameter are output to a storage medium.

15. The image processing device according to claim 12, wherein the first image and the imaging effect parameter are output to a remote device.

16. The image processing device according to claim 12, wherein:
   the imaging effect is a shift correction effect and the imaging effect parameter is a shift correction parameter; and
   the circuitry is configured to generate the shift correction parameter.

17. The image processing device according to claim 16, wherein the shift correction parameter is a rotation angle by which the second image is digitally rotated in three-dimensional space.

18. The image processing device according to claim 17, wherein the circuitry is configured to receive an input from a user to select a value of the angle of the shift correction parameter to be generated.

* * * * *